US012581460B2

(12) United States Patent
Wang et al.

(10) Patent No.: US 12,581,460 B2
(45) Date of Patent: Mar. 17, 2026

(54) SIDELINK PREPARATION PROCEDURE TIME REDUCTION

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/816,848

(22) Filed: Aug. 2, 2022

(65) Prior Publication Data

US 2024/0049183 A1    Feb. 8, 2024

(51) Int. Cl.
| | |
|---|---|
| *H04W 72/02* | (2009.01) |
| *H04L 1/00* | (2006.01) |
| *H04L 5/00* | (2006.01) |
| *H04W 72/0446* | (2023.01) |

(52) U.S. Cl.
CPC ........... *H04W 72/02* (2013.01); *H04L 1/0003* (2013.01); *H04L 5/0051* (2013.01); *H04W 72/0446* (2013.01)

(58) Field of Classification Search
CPC . H04W 72/02; H04W 72/0446; H04W 72/40; H04L 1/0003; H04L 5/0051
See application file for complete search history.

(56) References Cited

U.S. PATENT DOCUMENTS

| | | | |
|---|---|---|---|
| 2019/0149274 A1* | 5/2019 | Freda ................... | H04W 80/02 |
| | | | 370/329 |
| 2021/0050956 A1* | 2/2021 | Yeo ....................... | H04L 1/1822 |

FOREIGN PATENT DOCUMENTS

| | | | | |
|---|---|---|---|---|
| WO | WO-2021060936 A1 * | 4/2021 | ........... | H04L 1/0013 |

OTHER PUBLICATIONS

International Search Report and Written Opinion—PCT/US2023/070954—ISA/EPO—Oct. 26, 2023.
3GPP: "3rd Generation Partnership Project, Technical Specification Group Radio Access Network, NR, Physical Layer Procedures for Data (Release 16)", 3GPP TS 38.214 V16.3.0, Technical Specification, Sep. 2020, 165 Pages.

* cited by examiner

*Primary Examiner* — Jianye Wu
(74) *Attorney, Agent, or Firm* — QUALCOMM Incorporated

(57) ABSTRACT

Various aspects of the present disclosure generally relate to wireless communication. In some aspects, a user equipment (UE) may receive, from a network entity, a resource allocation associated with a sidelink communication. The UE may initiate a physical sidelink shared channel preparation procedure associated with the sidelink communication prior to receiving the resource allocation associated with the sidelink communication. Numerous other aspects are described.

30 Claims, 13 Drawing Sheets

500

1010 Receive, from a network entity, a resource allocation associated with a sidelink communication 1020 Initiate a PSSCH preparation procedure associated with the sidelink communication prior to receiving the resource allocation associated with the sidelink communication

1000

Receive, from a UE, a BSR associated with a sidelink communication, wherein the BSR indicates a TBS associated with the sidelink communication Transmit, to the UE, a resource allocation associated with a sidelink communication based at least in part on the TBS

1110

1120

1100

SIDELINK PREPARATION PROCEDURE TIME REDUCTION

FIELD OF THE DISCLOSURE

Aspects of the present disclosure generally relate to wireless communication and to techniques and apparatuses for sidelink preparation procedure time reduction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network entities that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network entity.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a resource allocation associated with a sidelink communication. The method may include initiating a physical sidelink shared channel (PSSCH) preparation procedure associated with the sidelink communication prior to receiving the resource allocation associated with the sidelink communication.

Some aspects described herein relate to a method of wireless communication performed by a network entity. The method may include receiving, from a UE, a buffer status report (BSR) associated with a sidelink communication, wherein the BSR indicates a transport block size (TBS) associated with the sidelink communication. The method may include transmitting, to the UE, a resource allocation associated with a sidelink communication based at least in part on the TBS.

Some aspects described herein relate to an apparatus for wireless communication at a UE. The apparatus may include a memory and one or more processors coupled to the memory. The one or more processors may be configured to receive, from a network entity, a resource allocation associated with a sidelink communication. The one or more processors may be configured to initiate a PSSCH preparation procedure associated with the sidelink communication prior to receiving the resource allocation associated with the sidelink communication.

Some aspects described herein relate to an apparatus for wireless communication at a network entity. The apparatus may include a memory and one or more processors coupled to the memory. The one or more processors may be configured to receive, from a UE, a BSR associated with a sidelink communication, wherein the BSR indicates a TBS associated with the sidelink communication. The one or more processors may be configured to transmit, to the UE, a resource allocation associated with a sidelink communication based at least in part on the TBS.

Some aspects described herein relate to a non-transitory computer-readable medium that stores a set of instructions for wireless communication by a UE. The set of instructions, when executed by one or more processors of the UE, may cause the UE to receive, from a network entity, a resource allocation associated with a sidelink communication. The set of instructions, when executed by one or more processors of the UE, may cause the UE to initiate a PSSCH preparation procedure associated with the sidelink communication prior to receiving the resource allocation associated with the sidelink communication.

Some aspects described herein relate to a non-transitory computer-readable medium that stores a set of instructions for wireless communication by a network entity. The set of instructions, when executed by one or more processors of the network entity, may cause the network entity to receive, from a UE, a BSR associated with a sidelink communication, wherein the BSR indicates a TBS associated with the sidelink communication. The set of instructions, when executed by one or more processors of the network entity, may cause the network entity to transmit, to the UE, a resource allocation associated with a sidelink communication based at least in part on the TBS.

Some aspects described herein relate to an apparatus for wireless communication. The apparatus may include means for receiving, from a network entity, a resource allocation associated with a sidelink communication. The apparatus may include means for initiating a PSSCH preparation procedure associated with the sidelink communication prior to receiving the resource allocation associated with the sidelink communication.

Some aspects described herein relate to an apparatus for wireless communication. The apparatus may include means for receiving, from a UE, a BSR associated with a sidelink communication, wherein the BSR indicates a TBS associated with the sidelink communication. The apparatus may include means for transmitting, to the UE, a resource allocation associated with a sidelink communication based at least in part on the TBS.

Aspects generally include a method, apparatus, system, computer program product, non-transitory computer-readable medium, user equipment, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
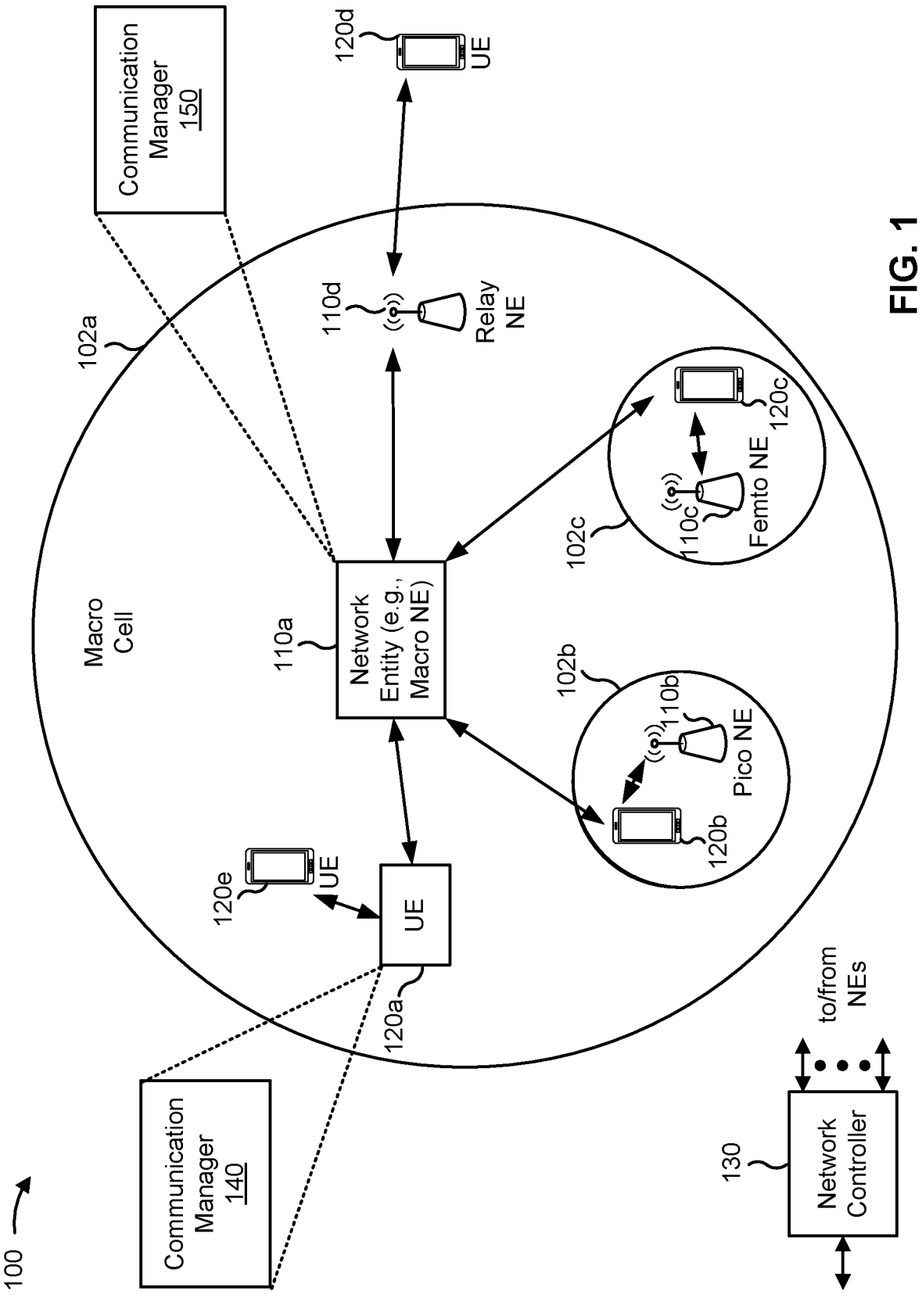
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network entities 110 (shown as a NE 110a, a NE 110b, a NE 110c, and a NE 110d), a user equipment (UE) 120 or multiple UEs 120 (shown as a UE 120a, a UE 120b, a UE 120c, a UE 120d, and a UE 120e), and/or other network entities. A network entity 110 is an entity that communicates with UEs 120. A network entity 110 (sometimes referred to as a NE) may include, for example, an NR network entity, an LTE network entity, a Node B, an eNB (e.g., in 4G), a gNB (e.g., in 5G), an access point, a transmission reception point (TRP), a base station, and/or a disaggregated component of a base station such as a centralized unit (CU), a distributed unit (DU), and/or a radio unit (RU), which is described in more detail in connection with the open radio access network (O-RAN) architecture described in FIG. 3. Each network entity 110 may provide communication coverage for a particular geographic area. In the Third Generation Partnership Project (3GPP), the term "cell" can refer to a coverage area of a network entity 110 and/or a network entity subsystem serving this coverage area, depending on the context in which the term is used.

A network entity 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network entity 110 for a macro cell may be referred to as a macro network entity. A network entity 110 for a pico cell may be referred to as a pico network entity. A network entity 110 for a femto cell may be referred to as a femto network entity or an in-home network entity. In the example shown in FIG. 1, the NE 110a may be a macro network entity for a macro cell 102a, the NE 110b may be a pico network entity for a pico cell 102b, and the NE 110c may be a femto network entity for a femto cell 102c. A network entity may support one or multiple (e.g., three) cells.

In some examples, a cell may not necessarily be stationary, and the geographic area of the cell may move according to the location of a network entity 110 that is mobile (e.g., a mobile network entity). In some examples, the network entities 110 may be interconnected to one another and/or to one or more other network entities 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity 110 or a UE 120) and send a transmission of the data to a downstream station (e.g., a UE 120 or a network entity 110). A relay station may be a UE 120 that can relay transmissions for other UEs 120. In the example shown in FIG. 1, the NE 110d (e.g., a relay network entity) may communicate with the NE 110a (e.g., a macro network entity) and the UE 120d in order to facilitate communication between the NE 110a and the UE 120d. A network entity 110 that relays communications may be referred to as a relay station, a relay network entity, a relay, or the like.

The wireless network 100 may be a heterogeneous network that includes network entities 110 of different types, such as macro network entities, pico network entities, femto network entities, relay network entities, or the like. These different types of network entities 110 may have different transmit power levels, different coverage areas, and/or different impacts on interference in the wireless network 100. For example, macro network entities may have a high transmit power level (e.g., 5 to 40 watts) whereas pico network entities, femto network entities, and relay network entities may have lower transmit power levels (e.g., 0.1 to 2 watts).

A network controller 130 may couple to or communicate with a set of network entities 110 and may provide coordination and control for these network entities 110. The network controller 130 may communicate with the network entities 110 via a backhaul communication link. The network entities 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network entity 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity 110, a resource allocation associated with a sidelink communication; and initiate a physical sidelink shared channel (PSSCH) preparation procedure associated with the sidelink communication prior to receiving the resource allocation associated with the sidelink communication. Additionally, or alternatively, the communication manager 140 may perform one or more other operations described herein.

In some aspects, the network entity 110 may include a communication manager 150. As described in more detail elsewhere herein, the communication manager 150 may receive, from a UE 120, a buffer status report (BSR) associated with a sidelink communication, wherein the BSR indicates a transport block size (TBS) associated with the sidelink communication; and transmit, to the UE 120, a resource allocation associated with a sidelink communication based at least in part on the TBS. Additionally, or alternatively, the communication manager 150 may perform one or more other operations described herein.

As indicated above, FIG. 1 is provided as an example. Other examples may differ from what is described with regard to FIG. 1.

Figure 2:
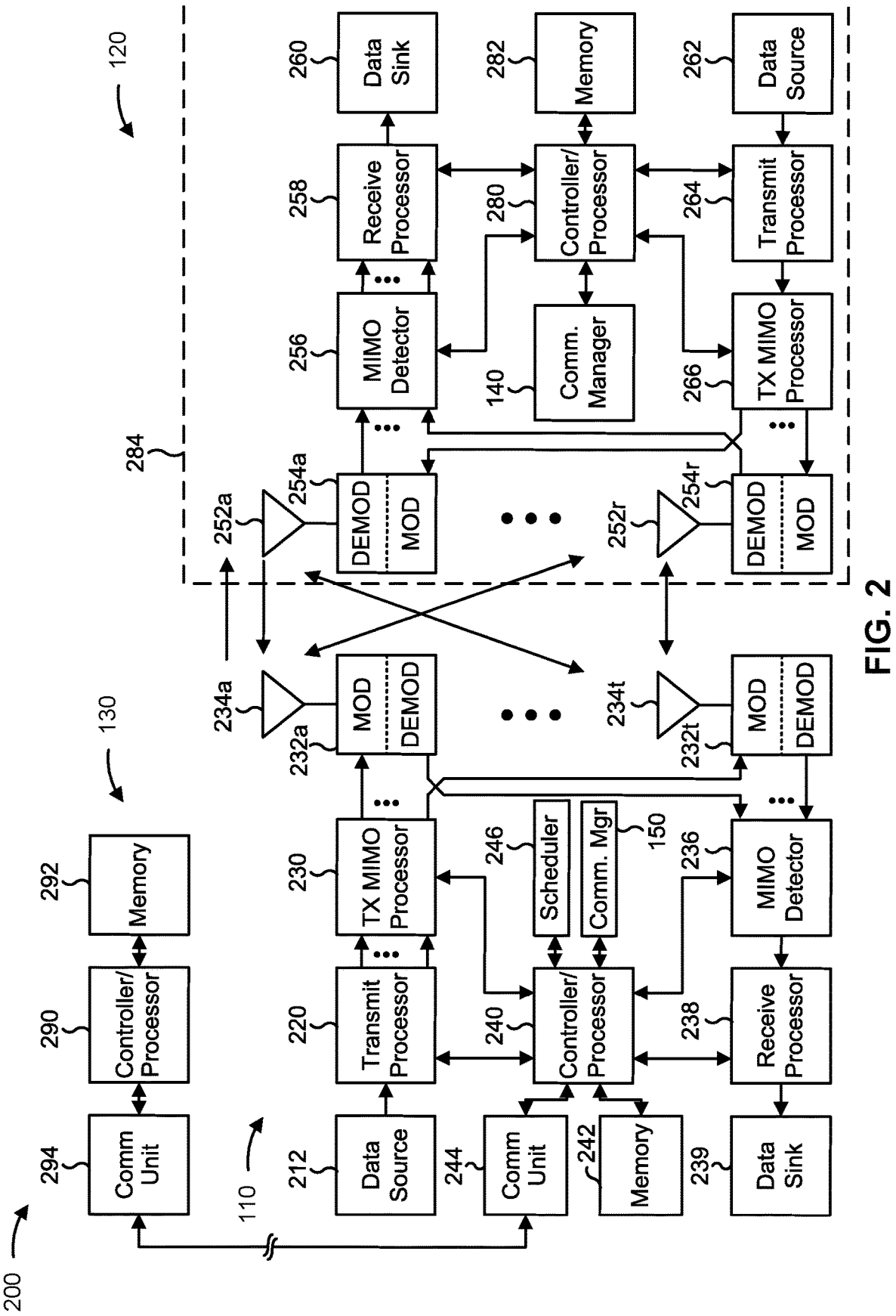
FIG. 2 is a diagram illustrating an example of a network entity in communication with a user equipment (UE) in a wireless network, in accordance with the present disclosure.

FIG. 2 is a diagram illustrating an example 200 of a network entity 110 in communication with a UE 120 in a wireless network 100, in accordance with the present disclosure. The network entity 110 may be equipped with a set of antennas 234a through 234t, such as T antennas (T≥1). The UE 120 may be equipped with a set of antennas 252a through 252r, such as R antennas (R≥1).

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network entity 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network entity 110 and/or other network entities 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-13).

At the network entity 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink and/or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-13).

The controller/processor 240 of the network entity 110, the controller/processor 280 of the UE 120, and/or any other component(s) of FIG. 2 may perform one or more techniques associated with sidelink preparation procedure time reduction, as described in more detail elsewhere herein. For example, the controller/processor 240 of the network entity 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network entity 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity 110 and/or the UE 120, may cause the one or more processors, the UE 120, and/or the network entity 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving, from a network entity 110, a resource allocation associated with a sidelink communication; and/or means for initiating a PSSCH preparation procedure associated with the sidelink communication prior to receiving the resource allocation associated with the sidelink communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity 110 includes means for receiving, from a UE 120, a BSR associated with a sidelink communication, wherein the BSR indicates a TBS associated with the sidelink communication; and/or means for transmitting, to the UE, a resource allocation associated with a sidelink communication based at least in part on the TBS. In some aspects, the means for the network entity 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
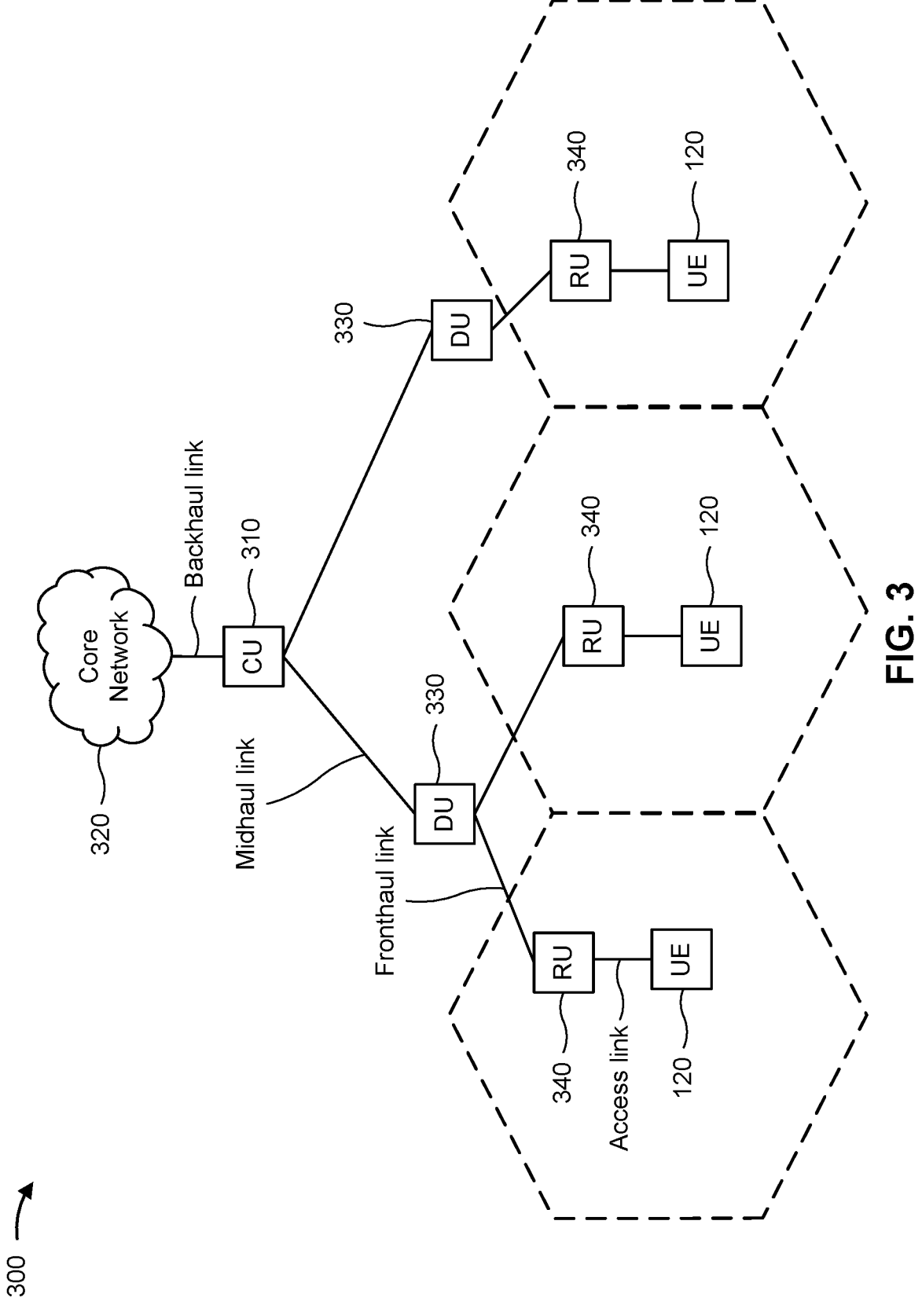
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a network entity 110 (e.g., an eNB, a gNB, and/or a base station) is provided by a DU 330 and one or more RUs 340 that communicate over a fronthaul link. Accordingly, as described herein, a network entity 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more network entity functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
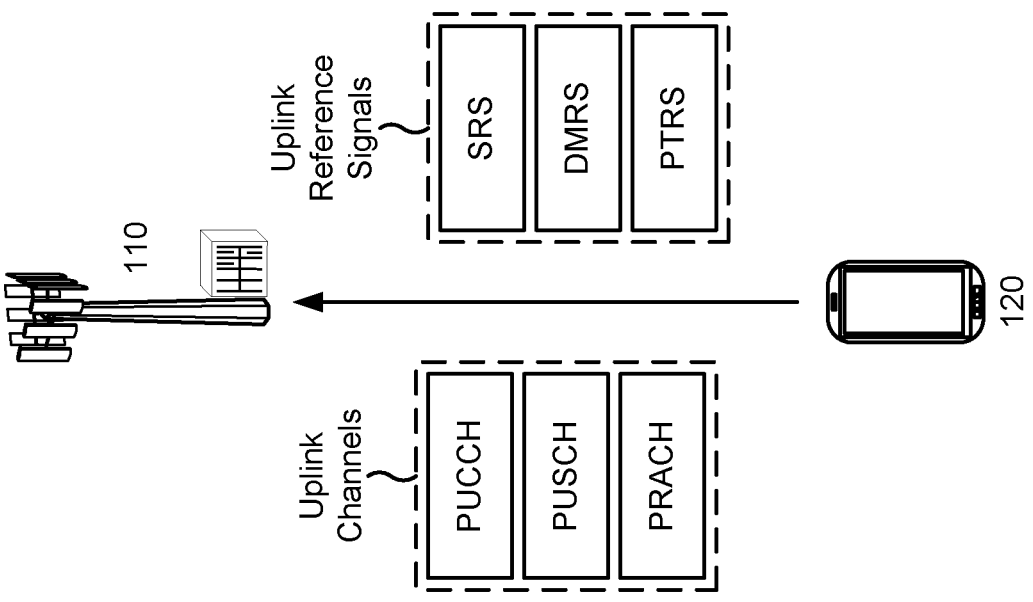
FIG. 4 is a diagram illustrating an example of physical channels and reference signals in a wireless network, in accordance with the present disclosure.
Figure 4:
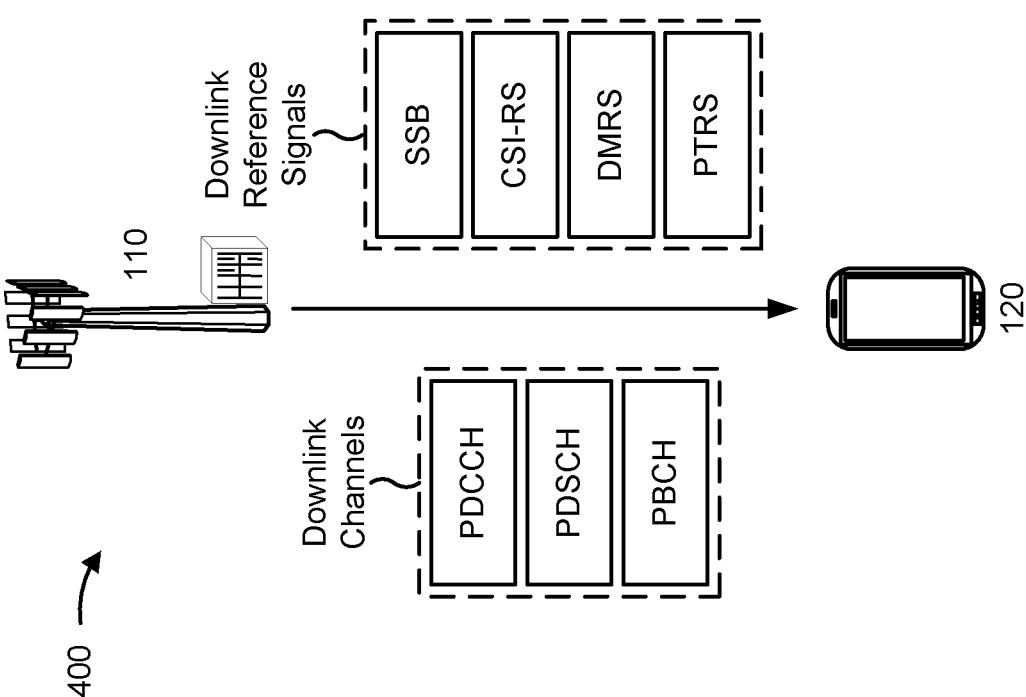

FIG. 4 is a diagram illustrating an example 400 of physical channels and reference signals in a wireless network, in accordance with the present disclosure. As shown in FIG. 4, downlink channels and downlink reference signals may carry information from a network entity 110 to a UE 120, and uplink channels and uplink reference signals may carry information from a UE 120 to a network entity 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network entity 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 110 may configure a set of CSI-RSs for the UE 120, and the UE 120 may measure the configured set of CSI-RSs. Based at least in part on the measurements, the UE 120 may perform channel estimation and may report channel estimation parameters to the network entity 110 (e.g., in a CSI report), such as a channel quality indicator (CQI), a precoding matrix indicator (PMI), a CSI-RS resource indicator (CRI), a layer indicator (LI), a rank indicator (RI), or an RSRP, among other examples. The network entity 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network entities in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network entity 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
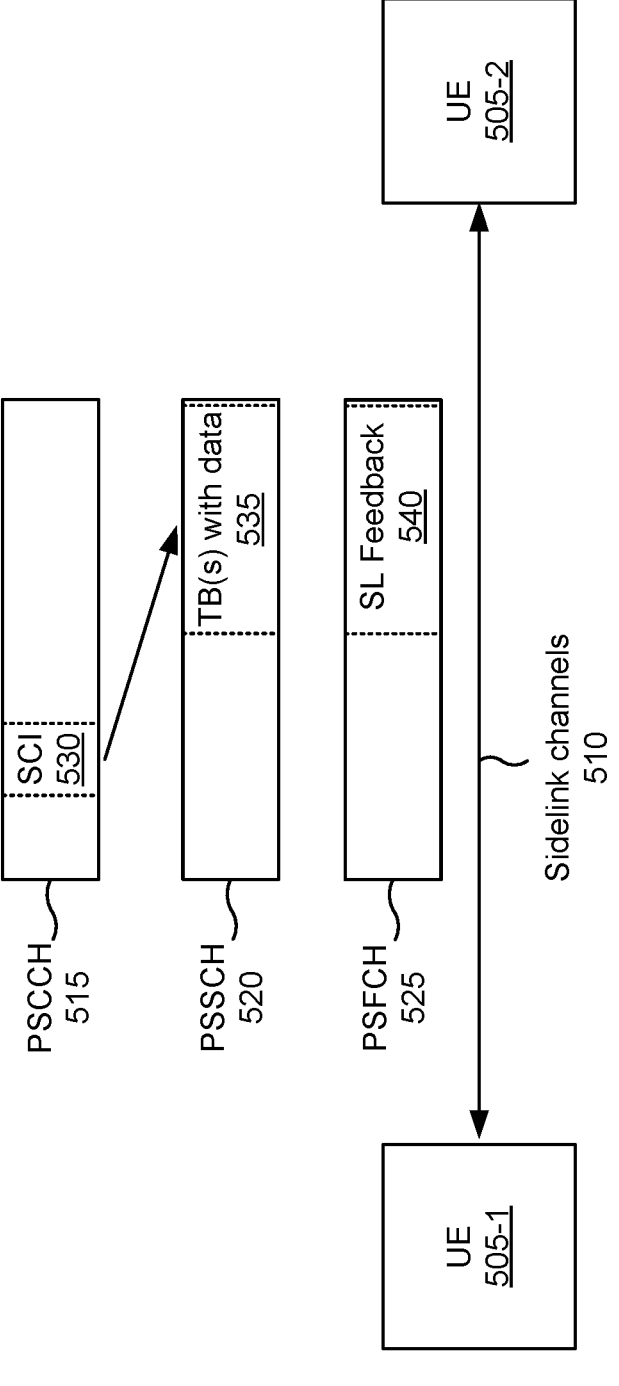
FIG. 5 is a diagram illustrating an example of sidelink communications, in accordance with the present disclosure.

FIG. 5 is a diagram illustrating an example 500 of sidelink communications, in accordance with the present disclosure. As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for P2P communications, D2D communications, V2X communications (e.g., which may include cellular V2X (C-V2X) communications, V2V communications, V2I communications, and/or V2P communications) and/or mesh networking. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, or symbols) using global navigation satellite system (GNSS) timing.

As further shown in FIG. 5, the one or more sidelink channels 510 may include a physical sidelink control channel (PSCCH) 515, a physical sidelink shared channel (PSSCH) 520, and/or a physical sidelink feedback channel (PSFCH) 525. The PSCCH 515 may be used to communicate control information, similar to a physical downlink control channel (PDCCH) and/or a physical uplink control channel (PUCCH) used for cellular communications with a network entity 110 via an access link or an access channel. The PSSCH 520 may be used to communicate data, similar to a physical downlink shared channel (PDSCH) and/or a physical uplink shared channel (PUSCH) used for cellular communications with a network entity 110 via an access link or an access channel. For example, the PSCCH 515 may carry sidelink control information (SCI) 530, which may indicate various control information used for sidelink communications, such as one or more resources (e.g., time resources, frequency resources, and/or spatial resources) where a transport block (TB) 535 may be carried on the PSSCH 520. The TB 535 may include data. The PSFCH 525 may be used to communicate sidelink feedback 540, such as hybrid automatic repeat request (HARD) feedback (e.g., acknowledgement or negative acknowledgement (ACK/NACK) information), transmit power control (TPC), and/or a scheduling request (SR).

Although shown on the PSCCH 515, in some aspects, the SCI 530 may include multiple communications in different stages, such as a first stage SCI (SCI-1) and a second stage SCI (SCI-2). The SCI-1 may be transmitted on the PSCCH 515. The SCI-2 may be transmitted on the PSSCH 520. The SCI-1 may include, for example, an indication of one or more resources (e.g., time resources, frequency resources, and/or spatial resources) on the PSSCH 520, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or an MCS. The SCI-2 may include information associated with data transmissions on the PSSCH 520, such as a HARQ process ID, a new data indicator (NDI), a source identifier, a destination identifier, and/or a channel state information (CSI) report trigger.

In some aspects, the one or more sidelink channels 510 may use resource pools. For example, a scheduling assignment (e.g., included in SCI 530) may be transmitted in sub-channels using specific resource blocks (RBs) across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a sidelink transmission mode (e.g., Mode 1) where resource selection and/or scheduling is performed by a network entity 110. For example, the UE 505 may receive a grant (e.g., in DCI or in an RRC message, such as for configured grants) from the network entity 110 for sidelink channel access and/or scheduling. Aspects of Mode 1 are described in more detail in connection with FIGS. 7 and 8. In some aspects, a UE 505 may operate using a transmission mode (e.g., Mode 2) where resource selection and/or scheduling is performed by the UE 505 (e.g., rather than a network entity 110). In some aspects, the UE 505 may perform resource selection and/or scheduling by sensing channel availability for transmissions. For example, the UE 505 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources and/or channel parameters. Additionally, or alternatively, the UE 505 may perform resource selection and/or scheduling by determining a channel busy ratio (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, and/or an MCS to be used for the upcoming sidelink transmission. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

In some V2X applications (e.g., C-V2X applications), a receiver UE 120 (e.g., the second UE 505-2) may perform blind decoding in all sidelink subchannels to receive sidelink communications. In that regard, the number of sidelink subchannels may be small, such as 1-27 subchannels (with each subchannel occupying one of 10, 15, 20, 25, 50, 75, or 100 physical resource blocks (PRBs)), such that blind decoding of all subchannels is feasible. Moreover, the PSCCH 515 and the PSSCH 520 may be transmitted within the same slot, with the PSSCH 520 occupying a number of contiguous subchannels (sometimes referred to as $N_{subchannel}^{SL}$) and/or with the PSCCH 515 occupying up to one subchannel associated with the lowest subchannel index. Moreover, the PSCCH 515 (which may contain SCI-1) may be configured to occupy 10, 12, 15, 20, or 25 PRBs, limited to a single subchannel, with a duration of the PSCCH 515 configured as two or three symbols. A size of the PSCCH 515 may be fixed for a given resource pool, with the PSCCH 515 occupying 10% to 100% of the first two or three symbols of subchannel, depending on the configuration.

In some aspects, the SCI-1 may be transmitted in the PSCCH 515 and may contain information about the PSSCH 520 bandwidth and resource reservations in future slots. For example, SCI 1_0 associated with the SCI-1 communication contained in the PSCCH 515 may specify a frequency domain resource allocation (FDRA), which may include $$\left\lceil \log \frac{N_{subchannel}^{SL}\left(N_{subchannel}^{SL}+1\right)}{2} \right\rceil$$

bits when associated with two reservations, and $$\left\lceil \log \frac{N_{subchannel}^{SL}\left(N_{subchannel}^{SL}+1\right)\left(2N_{subchannel}^{SL}+1\right)}{6} \right\rceil$$

bits when associated with three reservations. Additionally, or alternatively, SCI 1_0 may specify a time domain resource allocation (TDRA), which may include five bits when associated with two reservations, and nine bits when associated with three reservations. An SCI-2 communication, which may be transmitted in the PSSCH 520, may be found and decoded after decoding the PSCCH 515, with a source identifier and a destination identifier used to determine whether the packet is for the receiver UE 120 and to determine from which transmitter UE 120 the packet originated from. In some aspects, a subchannel in certain V2X applications may be large, such as associated with a minimum of 10 RBs.

As indicated above, FIG. 5 is provided as an example. Other examples may differ from what is described with respect to FIG. 5.

Figure 6:
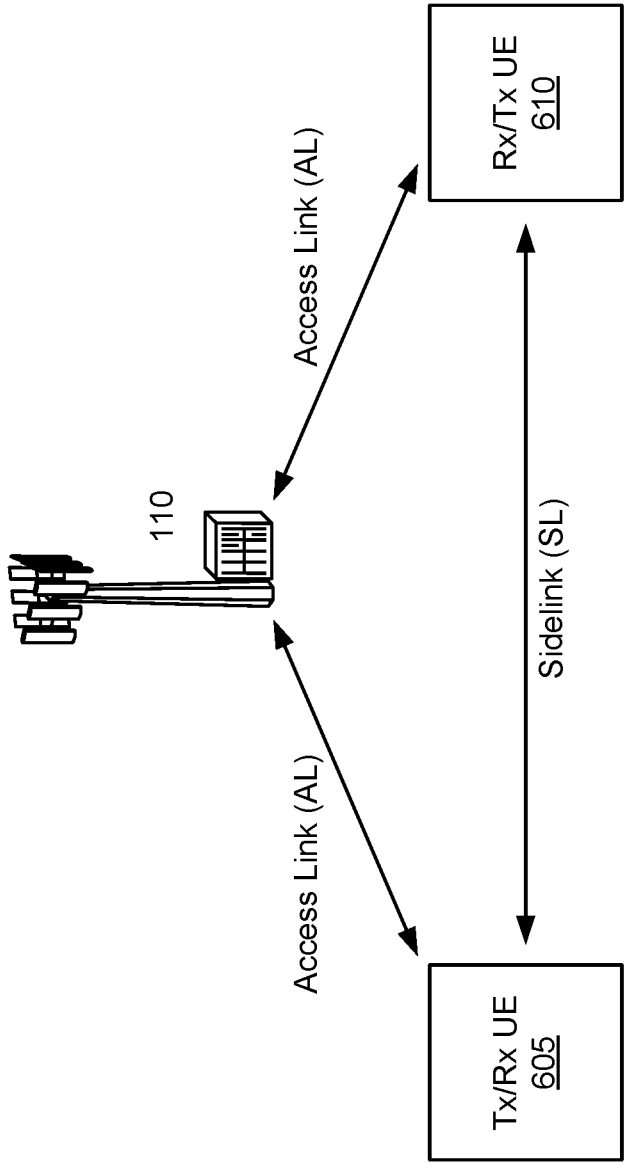
FIG. 6 is a diagram illustrating an example of sidelink communications and access link communications, in accordance with the present disclosure.

FIG. 6 is a diagram illustrating an example 600 of sidelink communications and access link communications, in accordance with the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a network entity 110 may communicate with the Tx/Rx UE 605 via a first access link. Additionally, or alternatively, in some sidelink modes, the network entity 110 may communicate with the Rx/Tx UE 610 via a second access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a network entity 110 and a UE 120 (e.g., via a Uu interface) may be referred to as an access link. Sidelink communications may be transmitted via the sidelink, and access link communications may be transmitted via the access link. An access link communication may be either a downlink communication (from a network entity 110 to a UE 120) or an uplink communication (from a UE 120 to a network entity 110).

As indicated above, FIG. 6 is provided as an example. Other examples may differ from what is described with respect to FIG. 6.

Figure 7:
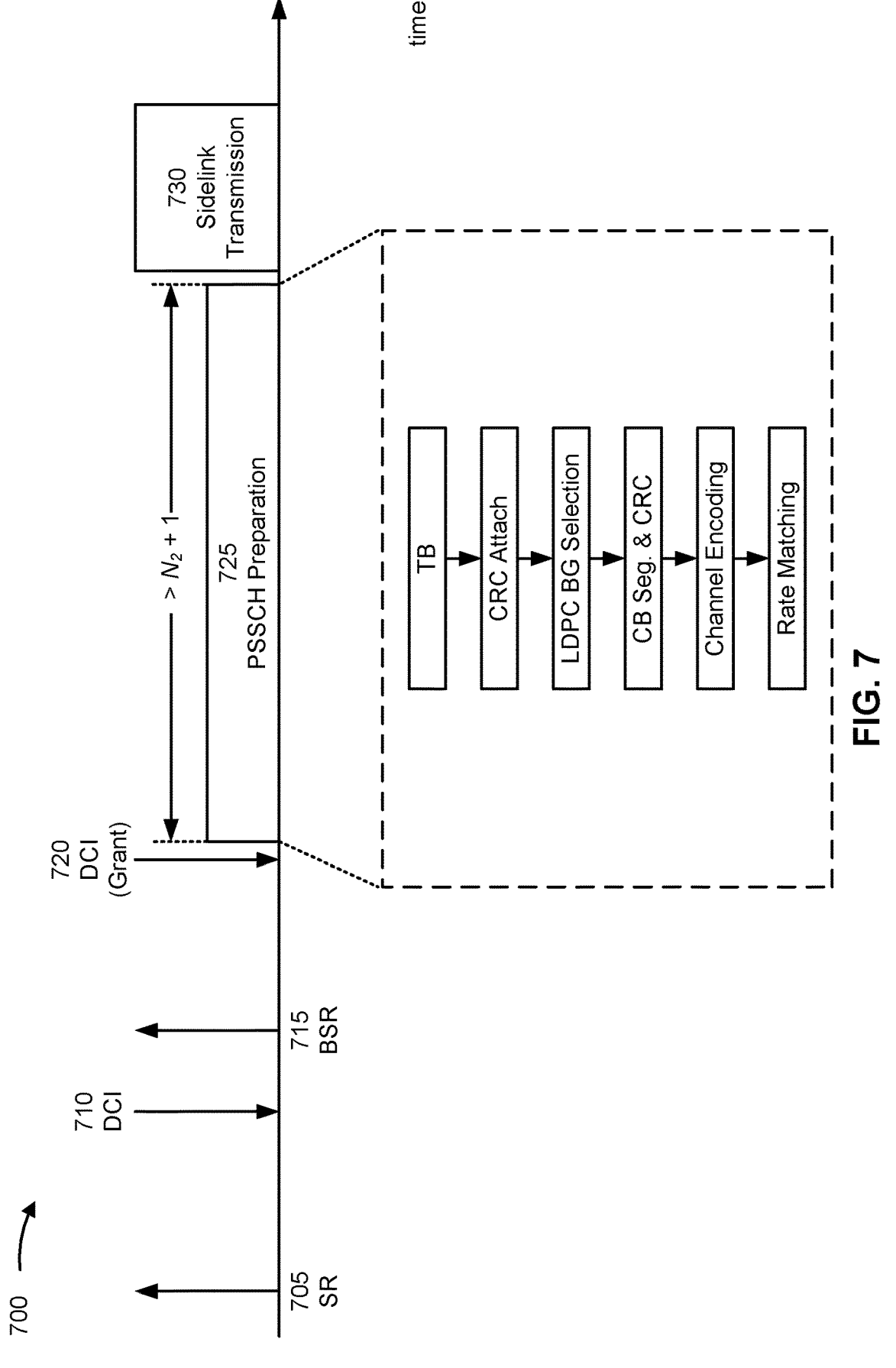
FIG. 7 is a diagram illustrating an example of a physical sidelink shared channel (PSSCH) preparation procedure, in accordance with the present disclosure.

FIG. 7 is a diagram illustrating an example 700 of a PSSCH preparation procedure, in accordance with the present disclosure.

As described above in connection with FIG. 5, when operating in sidelink transmission Mode 1, resource selection and/or scheduling is performed by a network entity 110. In such cases, and as shown by reference number 705, when a sidelink packet arrives in a buffer at a UE 120 (e.g., UE 505-1, UE 505-2, Tx/Rx UE 605, and/or Rx/TX UE 610), the UE 120 may transmit, to a network entity 110, an SR in a pre-defined occasion (e.g., an occasion in one of the uplink channels described in connection with FIG. 4) indicating that the UE 120 has data to transmit. In response, the network entity 110 may schedule uplink resources (e.g., PUSCH resources) for the UE 120 to report its buffer size and/or related information, such as via a DCI message (as shown by reference number 710) or an RRC message. As shown by reference number 715, the UE 120 may then transmit a buffer status report (BSR) associated with a sidelink communication using the uplink resources scheduled by the network entity 110 (e.g., using a MAC control element (MAC-CE) communication transmitted via the PUSCH resources scheduled by the network entity 110), which may indicate to the network entity 110 that the data in the buffer is sidelink data to be transmitted to another UE 120 (e.g., another one of UE 505-1, UE 505-2, Tx/Rx UE 605, and/or Rx/TX UE 610), the buffer size associated with the sidelink transmission, and/or related information. More particularly, the BSR may indicate the logical channel data amount of the packet to be transmitted in the sidelink.

As shown by reference number 720, the network entity 110 may transmit, to the UE 120, a DCI communication (sometimes referred to as a scheduling grant) that schedules sidelink resources (e.g., PSSCH resources) for the UE 120 to transmit one or more sidelink packets. The scheduling grant may indicate a range of MCS to be used for the sidelink transmission and/or resources to be used for the sidelink transmission, among other related information. For example, the DCI message may be a DCI format 3_0 message. A DCI format 3_0 message may include an indication of a resource pool index to be used for the sidelink transmission (sometimes referred to as sl-TxPoolScheduling), a time gap between the DCI format 3_0 message and the sidelink transmission (sometimes referred to as sl-DCI-ToSL-Trans), a HARQ process number (HPN), an NDI, a lowest subcarrier index associated with the sidelink resource allocation, SCI-1 fields (e.g., SCI 1_0 fields) such as indications of a TDRA and an FDRA associated with the sidelink transmission, an indication of PSFCH to HARQ feedback timing (sometimes referred to as sl-PSFCH-To-PUCCH), a PUCCH resource indicator, a configuration index, a counter sidelink assignment indicator (SAI), padding bits, and other information. In some aspects, the DCI format 3_0 message or a similar scheduling grant may specify a resource allocation for a TB (e.g., TB 535), and the DCI format 3_0 message may indicate up to three resources to be used for retransmissions associated with the TB (e.g., to be used as part of a HARQ process associated with the TB). In some aspects, the UE 120 may maintain a one-to-one mapping of an HPN in DCI and SCI for a given TB. Moreover, the NDI included in the DCI format 3_0 message or a similar scheduling grant may be used to toggle an NDI in SCI. Additionally, or alternatively, the DCI format 3_0 message or a similar scheduling grant may include a PUCCH resource for the UE 120 to provide sidelink HARQ feedback, which may be specified using an offset (e.g., using a feedback timing parameter) from a PDCCH carrying the DCI format 3_0 message or a similar scheduling grant to the PUCCH resource for providing the sidelink HARQ feedback.

As shown by reference number 725, the UE 120 may begin preparing the one or more sidelink packets for transmission after the scheduling grant is received from the network entity 110. As used herein, a PSSCH preparation process may refer to a process in which the UE 120 prepares a TB (e.g., TB 535) for transmission over the physical layer, such as a transmission within a PSSCH 520 or another physical channel. The UE 120 must receive the scheduling grant prior to beginning the PSSCH preparation process because the network entity 110's resource allocation in the scheduling grant is needed by the UE 120 to determine certain aspects of the sidelink transmission, such as a TB size (TBS) of the transmission, an MCS to be used for the transmission, and related aspects of the sidelink transmission. More particularly, before the UE 120 receives the scheduling grant from the network entity 110, the UE 120 does not know a resource allocation for transmission of the TB, a resource allocation for retransmission of the TB, an NDI (which may force the UE 120 to drop retransmission of TB because a maximum number of retransmissions is up to the network entity in Mode 1), and/or a range of MCSs to be used for the sidelink transmission. Once the scheduling grant is received, however, the UE 120 may select an appropriate MCS within the range specified by the network entity 110 to be used for the sidelink transmission, which may be based at least in part on CSI associated with the sidelink channel that is only known to the UE 120, not the network entity 110. The UE 120 may also decide which TB to transmit using the resource provided by the network entity 110, may determine whether or not a sidelink HARQ process should be enabled for the sidelink transmission, and/or may decide a corresponding HPN to be used for the sidelink transmission. Moreover, the UE 120 may determine a DMRS pattern and/or port to be used for the sidelink transmission, and/or may determine a number of transmission layers to be used for the sidelink transmission. Furthermore, the UE 120 may determine a type of precoding to be used for the sidelink transmission, may determine a CSI-RS to be used for the sidelink transmission, may determine a redundancy version (RV) identifier (RV-ID) to be used for the sidelink transmission, may determine a cast type to be used for the sidelink transmission, and/or may determine other transmission related parameters.

With knowledge of the resource allocation for the sidelink transmission, the UE 120 may prepare the one or more sidelink packets for transmission (e.g., may perform the PSSCH preparation procedure). For example, the PSSCH preparation procedure may one or more of the procedures such within the broken-line box accompanying reference number 725. This may include performing one or more of assembling the TB, attaching a cyclic redundancy check (CRC) to the TB, selecting a low density parity check (LDPC) base graph (BG) for the TB, performing code block (CB) segmentation for the TB, attaching a CRC to one or more CBs, performing channel encoding for the TB according to an MCS selected by the UE 120 within a range of MCSs indicated by the network entity 110, and performing a rate matching procedure associated with the TB.

In order to ensure the UE 120 has adequate time for TB preparation, such as the PSSCH preparation procedure shown at reference number 725, the network entity 110 may schedule resources for the sidelink transmission (e.g., via the sl-DCI-ToSL-Trans parameter) that occur no earlier than $N_2+1$ OFDM symbols after the scheduling grant. In some cases, a value of $N_2$ may be dependent on the subcarrier spacing (SCS) used for the sidelink transmission. For example, for SCSs of 15 kHz, 30 kHz, 60 kHz, and 120 kHz (e.g., μ=0, 1, 2, and 3, respectively), the value of $N_2$ may be equal to 10 OFDM symbols, 12 OFDM symbols, 23 OFDM symbols, and 36 OFDM symbols, respectively. Accordingly, in some cases, Mode 1 sidelink resource allocation, such as the Mode 1 sidelink resource allocation shown in FIG. 7, results in high latency, because much time may elapse between the UE 120's transmission of the SR until the UE 120's sidelink transmission of the TB, shown by reference number 730. The latency caused as a result of the Mode 1 resource allocation may be particularly problematic for time-sensitive sidelink communications, such as C-V2X communications, or the like.

Some techniques and apparatuses described herein enable PSSCH preparation by the UE 120 prior to receiving a resource allocation from the network entity 110. In some aspects, the UE 120 may indicate certain transmission parameters in the BSR transmitted to the network entity 110, and may begin a PSSCH preparation procedure prior to receiving a scheduling grant based at least in part on the indicated transmission parameters. For example, a sidelink transmission may be associated with an industrial internet of things (IIoT) application, which often includes a deterministic payload size. More particularly, in IIoT applications, sidelink communications may enable direct programmable logic controller (PLC) and sensors/actuators (SAs) communications, with a wireless PLC often controlling 20-50 SAs. In some aspects, these IIoT applications may be associated with a tight latency (e.g., 1-2 milliseconds) and an ultra-high reliability requirement (e.g., a $10^{-6}$ error rate). Moreover, traffic between such IIoT components may be deterministic, with small, known packet sizes in the range of 32-256 bytes (thus requiring a relatively small bandwidth, such as 2 RBs in some instances) typically transmitted between PLCs and/or SAs.

Accordingly, in some aspects, such as for IIoT applications with deterministic payload sizes and/or tight latency and ultra-high reliability requirements, the UE 120 may indicate determine a TBS prior to transmitting a BSR, and thus may indicate the TBS in the BSR sent to the network entity 110 and therefore begin the PSSCH preparation prior to ever receiving the scheduling grant. Additionally, or alternatively, based at least in part on the UE 120's knowledge of the sidelink channel (e.g., the PSSCH 520), the UE 120 may determine, prior to receiving the scheduling grant, an MCS to be used for the sidelink transmission, and thus the UE 120 may indicate the selected MCS in the BSR and begin the PSSCH preparation prior to receiving the scheduling grant based at least in part on the knowledge of the MCS. By the UE 120 beginning a PSSCH preparation procedure prior to receiving a resource allocation from the network entity 110 (and, in some aspects, prior to transmitting the BSR to the network entity 110), a time between the transmission of the SR and the corresponding sidelink transmission may be reduced, resulting in reduced latency, increased throughput, and overall more efficient usage of network resources. For example, some techniques and apparatuses described herein may result in latency reduction of 40% or more as compared to the PSSCH preparation process described in connection with FIG. 7, which may equate to a time savings of multiple OFDM symbols (e.g., four or more OFDM symbols), which may be more substantial for larger TBSs associated with a large number of CBs, or the like.

As indicated above, FIG. 7 is provided as an example. Other examples may differ from what is described with respect to FIG. 7.

Figure 8:
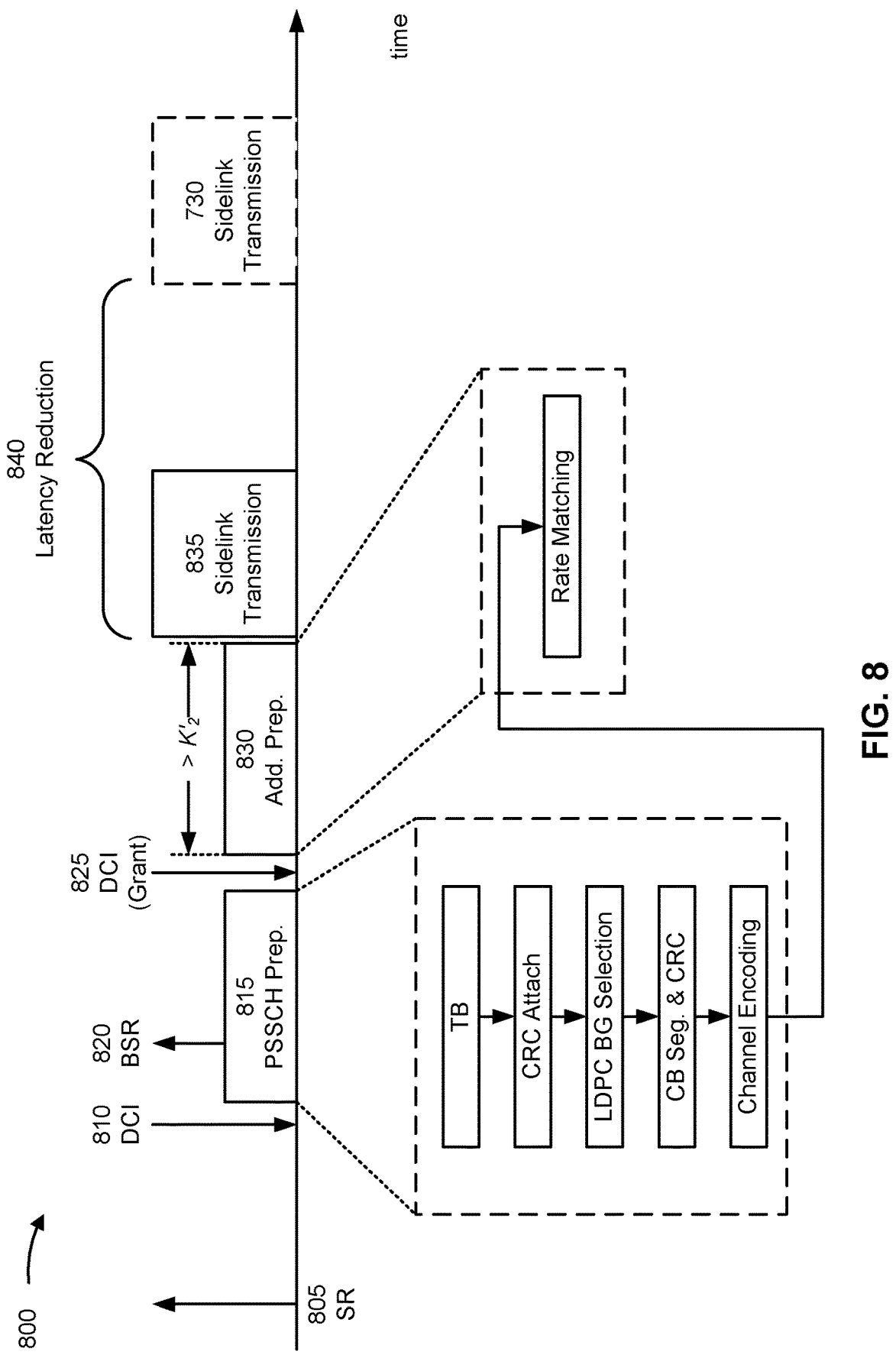
FIG. 8 is a diagram illustrating another example of a PSSCH preparation procedure, in accordance with the present disclosure.

FIG. 8 is a diagram illustrating another example 800 of a PSSCH preparation procedure, in accordance with the present disclosure.

The example shown in FIG. 8 includes similar messages transmitted between a UE 120 (e.g., UE 505-1, UE 505-2, Tx/Rx UE 605, and/or Rx/TX UE 610) and a network entity 110, but with a PSSCH preparation procedure beginning earlier (e.g., closer in time to the transmission of the SR) in order to reduce an amount of time between the SR and the associated sidelink transmission. More particularly, when a sidelink packet arrives in a buffer at the UE 120, the UE 120 may transmit, to the network entity 110, an SR in a pre-defined occasion (e.g., an occasion in one of the uplink channels described in connection with FIG. 4) indicating that the UE 120 has sidelink data to transmit to another UE 120 (e.g., another one of UE 505-1, UE 505-2, Tx/Rx UE 605, and/or Rx/TX UE 610), as shown at reference number 805. The SR may be similar to the SR described above in connection with reference number 705. In response, the network entity 110 may schedule uplink resources (e.g., PUSCH resources) for the UE 120 to report its buffer size and/or related information. The UE 120 may receive an indication of the scheduled uplink resources via a DCI message, as shown by reference number 810, or an RRC message, or the like. The message indicated by reference number 810 may be similar to the message described above in connection with reference number 710.

As shown in the broken-line box accompanying the PSSCH preparation procedure indicated at reference number 815, in some aspects the UE 120 may begin performing some (e.g., a majority) of the TB preparation steps described in connection with reference number 725 prior to receiving a scheduling grant from the network entity 110, and, in some aspects, even prior to transmitting the BSR to the network entity 110. Put another way, in some aspects, the UE 120 may begin a PSSCH preparation procedure without knowing the resource allocation from the network entity 110. The UE 120 may be able to begin the PSSCH preparation at an early stage (e.g., prior to receiving the scheduling grant) because, in some aspects, the sidelink transmission may be associated with a known TBS (e.g., the sidelink transmission may be associated with a deterministic payload or the like), may be associated with an MCS chosen by the UE 120 prior to receiving the scheduling grant, and/or may be associated with other transmission parameters selected by the UE 120 prior to receiving the scheduling grant.

More particularly, the UE 120 may prepare a TB (e.g., TB 535) and/or determine a TBS prior to receiving the scheduling grant and/or prior to knowing the sidelink resource allocation. Additionally, or alternatively, the UE 120 may attach a CRC to the TB (with a number of CRC bits used dependent upon the TBS) prior to receiving the scheduling grant and/or prior to knowing the sidelink resource allocation. Additionally, or alternatively, the UE 120 may select an LDPC BG prior to receiving the scheduling grant and/or prior to knowing the sidelink resource allocation. For example, the UE 120 may select a LDPC BG based at least in part on a target code rate, which may or may not be reported to the network entity 110. Additionally, or alternatively, the UE 120 may perform CB segmentation and attach a CRC to each CB prior to receiving the scheduling grant and/or prior to knowing the sidelink resource allocation. In some aspects, performing CB segmentation may be based at least in part the TBS plus the attached CRC and/or the selected LDPC BG. Additionally, or alternatively, the UE 120 may perform channel encoding prior to receiving the scheduling grant and/or prior to knowing the sidelink resource allocation, such as computing check bits into the buffer or the like.

In some aspects, the UE 120 may select and/or determine certain transmission parameters prior to transmitting the BSR (e.g., TBS, MCS, BG, or the like) and signal the selected transmission parameters to the network entity 110 via the BSR. For example, as shown by reference number 820, the UE 120 may transmit, to the network entity 110, a BSR, which may be similar to the BSR described above in connection with reference number 715. However, in this aspect, the BSR may include additional information, such as an indication of a TBS associated with a sidelink transmission and/or an indication of a selected MCS associated with the sidelink transmission. Additionally, or alternatively, the UE 120 may indicate certain additional channel information in the BSR, such as CSI associated with the sidelink channel (e.g., the PSSCH), CQI associated with the sidelink channel, or similar information. Additionally, or alternatively, the UE 120 may indicate a selected BG in the BSR, and/or the UE 120 may indicate a selected code rate in the BSR.

In some aspects, the UE 120 may not report a selected modulation order, but instead the network entity 110 may assume a certain MCS will be implemented by the UE 120. For example, the network entity 110 may be configured to assume that the UE 120 will use QPSK for sidelink transmissions, and thus may determine a number of resource elements (REs) for a resource allocation based at least in part on an assumption that QPSK will be used even in the absence of signaling from the UE 120 of a selected MCS. In such aspects, the UE 120 may provide an indication of a scaling factor (sometimes referred to as a TB scaling factor) to be used by the network entity 110 if the UE 120 will implement modulation higher or lower than QPSK. For example, if the UE 120 will implement 16 quadrature amplitude modulation (QAM) for the sidelink transmission rather than QPSK, the BSR may indicate a scaling factor of less than one such that the network entity 110 allocates less REs than it would have if the UE 120 was implementing QPSK. Alternatively, if the UE 120 will implement binary phase-shift keying (BPSK) for the sidelink transmission rather than QPSK, the BSR may indicate a scaling factor of greater than one such that the network entity 110 allocates more REs than it would have if the UE 120 was implementing QPSK. In some other aspects, the UE 120 may include an MCS indication and/or a CQI indication in the BSR (e.g., within a MAC-CE carrying the BSR), and the network entity 110 may scale the indicated buffer size and/or the indicated TBS by the modulation order and/or the code rate. For example, in some aspects, the TBS may be scaled according to the expression TBS/(modulation order×code rate×a number of transmission layers×(1−overhead)).

In some aspects, a UE 120 may use the BSR described in connection with reference number 820 (e.g., a BSR indicating certain transmission parameters such as MCS, TBS, BG, code rate, or the like) for certain, urgent traffic and/or for certain types of TBs, but not for less-urgent traffic and/or other types of TBs. For example, a UE 120 may use the BSR for high-priority traffic (e.g., traffic associated with a priority value that satisfies a priority threshold), and/or for traffic associated with a TBS that satisfies a TBS threshold. Moreover, in some aspects, the BSR may include one or more fields indicating whether certain transmission parameters are indicated by the BSR. For example, the BSR may be associated with a MAC-CE with an enhanced logical channel identity (eLCID) field and/or other dedicated field indicating a type of BSR being transmitted. For example, the eLCID field and/or other dedicated field may indicate that the BSR indicates one of a raw TBS (e.g., a TBS before modulation), or else a TBS with MCS consideration (e.g., a TBS after modulation).

Additionally, or alternatively, the BSR may indicate whether the TBS is a fixed TBS or a flexible TBS. An indication of a fixed TBS may signal that the UE 120 may not be capable of inserting padding bits or otherwise segmenting the TB to change the TBS to fit a resource allocation from the network entity 110. However, an indication of a flexible TBS may signal that the UE 120 may perform padding or segmentation, if necessary, which will be described in more detail below in connection with reference number 835.

As shown by reference number 825, the UE 120 may receive a DCI message or similar message indicating a resource allocation for the UE 120 to perform a sidelink transmission (e.g., a scheduling grant), which may include similar information as described above in connection with reference number 720. More particularly, in some aspects, the scheduling grant may be a DCI format 3_0 message that may include an indication of a resource pool index to be used for the sidelink transmission (e.g., sl-TxPoolScheduling), a time gap between the DCI formation 3_0 message and the sidelink transmission (e.g., sl-DCI-ToSL-Trans), an HPN, an NDI, a lowest subcarrier index associated with the sidelink resource allocation, SCI-1 such as indications of a TDRA and an FDRA associated with the sidelink transmission, an indication of PSFCH to HARQ feedback timing (e.g., sl-PSFCH-ToPUCCH), a PUCCH resource indicator, a configuration index, a counter SAI, padding bits, and other information. Moreover, in aspects in which the selected MCS was indicated by the BSR, the scheduling grant may schedule sidelink resources based at least in part on the selected MCS (e.g., the network entity 110 may take into account a modulation order when determining a number of REs to be scheduled for the sidelink transmission).

As shown by reference number 830, after receiving the scheduling grant, the UE 120 may perform additional PSSCH preparation, if necessary. That is, the UE 120 may perform one or more PSSCH preparation steps that the UE 120 was unable to perform prior to receiving a resource allocation from the network entity 110 and/or or one or more PSSCH preparation steps that the UE 120 did not complete or otherwise have time to perform prior to receiving the scheduling grant. For example, as indicated by the broken-line box accompanying the additional preparation step indicated by reference number 830, in this aspect the UE 120 may perform a rate matching procedure or a similar preparation step after receiving the scheduling grant.

In this regard, the amount of processing time following the receipt of the scheduling grant may be reduced because less PSSCH preparation may be needed after receipt of the scheduling grant because at least some PSSCH preparation has been completed by the UE 120 prior to receiving the scheduling grant. Accordingly, in some aspects the resources allocated for the sidelink transmission may be scheduled closer to the scheduling grant (e.g., may be scheduled with a smaller time gap defined by sl-DCI-ToSL-Trans) than for the PSSCH preparation procedure described in connection with FIG. 7. More particularly, rather than scheduling the sidelink transmission for a period of time no sooner than $N_2+1$ OFDM symbols after the scheduling grant, as described in connection with FIG. 7, in this aspect, the network entity 110 may schedule the sidelink transmission for a period of time no sooner than a time gap sometimes referred to as $K'_2$, which may be less than $N_2+1$ (e.g., $K'_2 < N_2 + 1$). Thus, after $K'_2$ has elapsed (which, again, may be shorter than $N_2 + 1$), the UE 120 may transmit the sidelink communication using the resources allocated by the scheduling grant, as shown by reference number 835. Notably, in this aspect the sidelink transmission may be scheduled closer to the scheduling grant than the sidelink transmission described above in connection with reference number 730 because $K'_2 < N_2 + 1$, reducing latency associated with the sidelink reduction. For example, aspects of the disclosure may lead to a latency reduction equal to a time period between a time when the sidelink transmission shown by reference number 835 is sent and a time when the sidelink transmission would have been sent using the process shown in FIG. 7, which is indicated in FIG. 8 by reference number 840.

In some aspects, because the UE 120 may begin the PSSCH preparation prior to receiving the resource allocation in the scheduling grant, the resource allocation may not align with the TBS. That is, in some aspects, the network entity 110 may allocate more or less REs for the sidelink transmission than is necessary for a given TBS. In some aspects, if a number of REs indicated by the scheduling grant is smaller than a threshold (e.g., if the number of allocated REs is smaller than the TBS), the UE 120 may drop and/or disregard the scheduling grant for that particular TB transmission. Put another way, in aspects in which a TBS is a fixed TBS that cannot be segmented or the like, if the resource allocation is smaller than the fixed TBS, the UE 120 may decline to use the resource allocation for transmitting the fixed TBS. In some aspects, the UE 120 may nonetheless use the allocated resources for a different sidelink transmission, such as for a sidelink transmission associated with a flexible TBS (e.g., a TBS that may be segmented, or the like). In some aspects, if the UE 120 is dropping the allocated resources due to the TBS being a fixed TBS or the like, the UE 120 may indicate to the network entity 110 that the scheduling grant is dropped because it does not correspond to the fixed TBS (e.g., because the resource allocation is too small for the TBS).

Alternatively, if a number of REs indicated by the scheduling grant is smaller than the threshold (e.g., if the resource allocation is smaller than the TBS), the UE 120 may truncate the transmission in order to transmit a portion of the sidelink transmission using the allocated resources. For example, the UE 120 may transmit less than all CBs associated with the sidelink transmission, and, in some aspects, may transmit any remaining CBs using retransmission resources (e.g., using resources associated with a HARQ process or the like). Alternatively, the UE 120 may trigger another SR (similar to the SR described above in connection with reference number 805) and/or another BSR (similar to the BSR describe above in connection with reference number 820) in order to receive another resource allocation for transmitting the remaining CBs. In such aspects, a receiver UE 120 may need to wait for another transmission (e.g., a transmission of the remaining CBs transmitted in retransmission resources and/or in additionally allocated resources) before the TB may be assembled and delivered to a MAC layer at the receiver UE 120. In such aspects, the transmitter UE 120 may indicate to the receiver UE 120 that the sidelink transmission has been truncated, such as via SCI-2 signaling, or the like.

In aspects in which the number of REs indicated by the scheduling grant is larger than the threshold (e.g., in aspects in which the resource allocation is larger than the TBS), the UE 120 may transmit the TB using the allocated resources, together with some additional data and/or information. For example, in some aspects, the UE 120 may append padding bits to the TB. Additionally, or alternatively, the UE 120 may use the excess REs for transmitting reference signals, such as sidelink CSI-RSs, additional DMRSs, or the like. Additionally, or alternatively, the UE 120 may repeat certain information using the excess REs, such as by repeating bits in the UE 120's circular buffer. Additionally, or alternatively, the UE 120 may use a different modulation order (e.g., a lower modulation order) while maintaining the same forward error correction (FEC) rate in order utilize the excess REs. In such aspects, the transmitter UE 120 may signal to the network entity 110 and/or the receiver UE 120 that a different modulation order is being used, such as by signaling a scaling factor (sometimes referred to as an SCI scaling factor) applied to a previously communicated MCS, or the like. Additionally, or alternatively, the UE 120 may only use as many resources in the resource allocation as are needed to transmit the TB. For example, if the resource allocation includes three subchannels but only two subchannels are needed to transmit the full TB, the UE 120 may perform the sidelink transmission using two of the three subchannels.

As indicated above, FIG. 8 is provided as an example. Other examples may differ from what is described with respect to FIG. 8.

Figure 9:
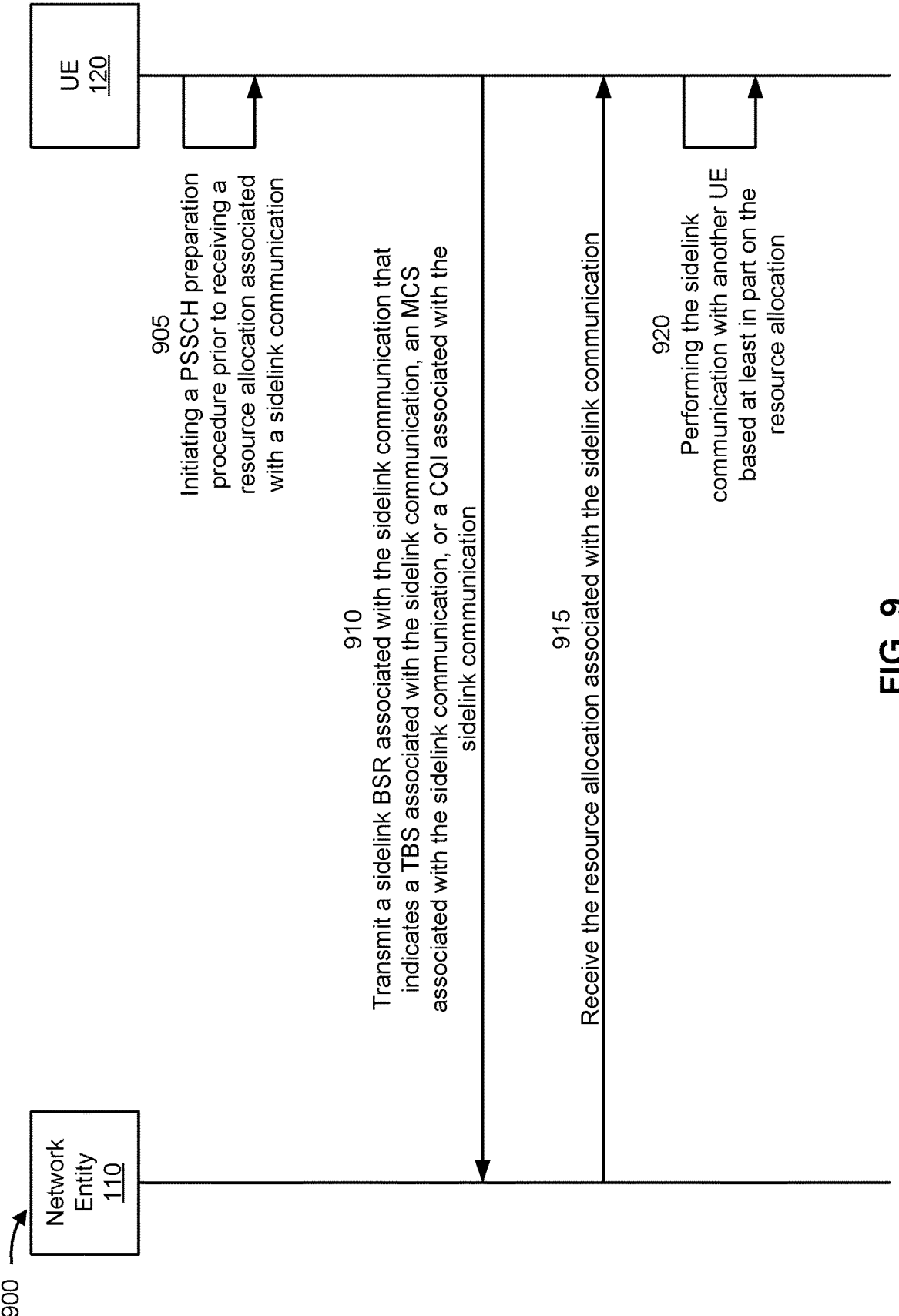
FIG. 9 is a diagram of an example associated with a sidelink preparation procedure time reduction, in accordance with the present disclosure.

FIG. 9 is a diagram of an example 900 associated with a sidelink preparation procedure time reduction, in accordance with the present disclosure. As shown in FIG. 9, a UE 120 (e.g., UE 505-1, UE 505-2, Tx/Rx UE 605, Rx/TX UE 610, or a similar UE) and a network entity 110 may communicate with each other. In some aspects, the UE 120 and the network entity 110 may be part of a wireless network (e.g., wireless network 100). The UE 120 and the network entity 110 may have established a wireless connection prior to operations shown in FIG. 9. In some aspects, the UE 120 may be in communication with another UE 120 (e.g., another one of the UE 505-1, UE 505-2, Tx/Rx UE 605, Rx/TX UE 610, or a similar UE) via a sidelink.

As shown by reference number 905, the UE 120 may initiate a PSSCH preparation procedure associated with a sidelink communication prior to receiving a resource allocation associated with the sidelink communication. For example, in some aspects, the UE 120 may perform one or more of the PSSCH preparation steps described in connection with reference number 815 prior to receiving a resource allocation associated with the sidelink communication. More particularly, prior to receiving the resource allocation associated with the sidelink communication, the UE 120 may attach a CRC to a TB, select a LDPC BG, perform CB segmentation, attach a CRC to one or more CBs, perform channel encoding, and/or perform similar PSSCH preparation steps.

As shown by reference number 910, the UE 120 may transmit, to the network entity 110, a BSR. For example, the UE 120 may transmit the BSR described in connection with reference number 820. In that regard, the BSR may indicate certain transmission parameters associated with the sidelink communication, such as a TBS associated with the sidelink communication, an MCS associated with the sidelink communication (or, in some aspects, multiple candidate MCSs associated with the sidelink communication), a CQI associated with the sidelink communication, a selected BG for LDPC encoding, or similar transmission parameters, as described above in connection with reference number 820. In aspects in which the BSR includes the TBS, the TBS may be based at least in part on a selected MCS associated with the sidelink communication (e.g., the TBS may take into bits needed for the selected MCS). In such aspects, the BSR may including an indication that the TBS is associated with a MCS, such as within an eLCID or dedicated field of the BSR, as described in connection with reference number 820. Moreover, the BSR may indicate whether the TBS is a fixed size or a flexible size, as described. In some aspects, the BSR may indicate a priority value associated with the TBS. For example, the BSR may indicate that the TBS is associated with a priority value that exceeds a threshold priority value. Moreover, in some aspects, the UE 120 may initiate the PSSCH preparation procedure associated with the sidelink communication prior to transmitting a BSR associated with the sidelink communication, as described in connection with reference numbers 815 and 820.

As shown by reference number 915, the UE 120 may receive, from the network entity 110, a resource allocation associated with the sidelink communication. For example, the UE 120 may receive a DCI message or an RRC message indicating the resource allocation associated with the sidelink communication, such as the scheduling grant described in connection with reference number 825. In aspects in which the BSR indicated a TBS, an MCS, and/or a CQI associated with the sidelink communication, and the resource allocation may be based at least in part on the TBS, the MCS, and/or the CQI. Moreover, and as described in connection with reference number 825, in some aspects the network entity 110 may assume that the UE 120 will use a certain MCS for the sidelink communication, such as QPSK modulation. In that regard, the resource allocation may be based at least in part on a determined number of REs associated with the QPSK modulation. In such aspects, if the sidelink communication is associated with a selected modulation different than QPSK modulation (e.g., if the UE 120 selects a different MCS), and the BSR may further indicate a TB scaling factor associated with the selected modulation, as described above in connection with reference number 820.

As shown by reference number 920, the UE 120 may perform sidelink communication with the other UE 120 based at least in part on the resource allocation. For example, the UE 120 may perform any additional PSSCH preparation steps, such as the rate matching step described in connection with reference number 830, and then transmit a sidelink communication (e.g., a TB) to the other UE 120 using the resources allocated by the network entity 110 indicated by the communication described in connection with reference number 915.

In some aspects, the resource allocation associated with the sidelink communication may include a number of REs that is smaller than an RE threshold (e.g., the allocated REs may be less than necessary to transmit the entire sidelink communication). In such aspects, the UE 120 may not use the resource allocation for the sidelink communication, but instead may transmit, to the other UE 120, another sidelink communication using the resource allocation, and/or may transmit, to the network entity 110, an indication that the resource allocation is not being used for the sidelink communication, as described in connection with reference number 835. Alternatively, if the resource allocation associated with the sidelink communication includes a number of REs that is smaller than an RE threshold, the UE 120 may transmit, to the other UE 120, an indication that only a portion of the sidelink communication will be transmitted using the resource allocation for the sidelink communication. In such aspects, the UE 120 may transmit, to the other UE 120, a first portion of the sidelink communication using the resource allocation for the sidelink communication, and a second portion of the sidelink communication using a resource allocation associated with a retransmission communication. Additionally, or alternatively, the UE 120 may transmit, to the network entity 110, another BSR associated with a portion of the sidelink communication in order to receive an additional resource allocation for transmitting the remaining portion of the sidelink communication, as described in connection with reference number 835.

In some other aspects, the resource allocation associated with the sidelink communication may include a number of REs that is larger than an RE threshold (e.g., the allocated REs may be more than necessary to transmit the entire sidelink communication). In such aspects, the UE 120 may append at least one of padding bits, a sidelink CSI-RS, or a DMRS to the sidelink communication, as described in connection with reference number 835. Additionally, or alternatively, if the number of REs is larger than the RE threshold, the UE 120 may repeat bits in a circular buffer associated with the sidelink communication, the UE 120 may select a different modulation order associated with the sidelink communication, and/or the UE 120 may transmit, to the other UE 120, the sidelink communication using a portion of the resource (e.g., using a subset of subchannels of the resource allocation), as described in connection with reference number 835.

In some aspects, the UE 120 may be permitted to transmit the sidelink communication to the other UE 120 earlier than the UE 120 would have been permitted to transmit the sidelink communication under certain legacy procedures, such as the procedures described in connection with FIG. 7. More particularly, in some aspects, the sidelink communication may be permitted to be transmitted after a time gap (e.g., $K'_2$) following reception of the resource allocation associated with the sidelink communication, with the time gap being less than $N_2+1$ symbols (e.g., the time gap described in connection with FIG. 7). In such aspects, $N_2$ may be equal to one of 10, 12, 23, or 36, corresponding to subcarrier spacings of 15 kHz, 30 kHz, 60 kHz, and 120 kHz (e.g., $\mu=0$, 1, 2, and 3), respectively. In that regard, based at least in part on UE 120 beginning a PSSCH preparation procedure prior to receiving a resource allocation associated with a sidelink communication, the UE 120 and/or the network entity 110 may communicate with reduced latency (e.g., may communication with the latency reduction described in connection with reference number 840), among other benefits.

As indicated above, FIG. 9 is provided as an example. Other examples may differ from what is described with respect to FIG. 9.

Figure 10:
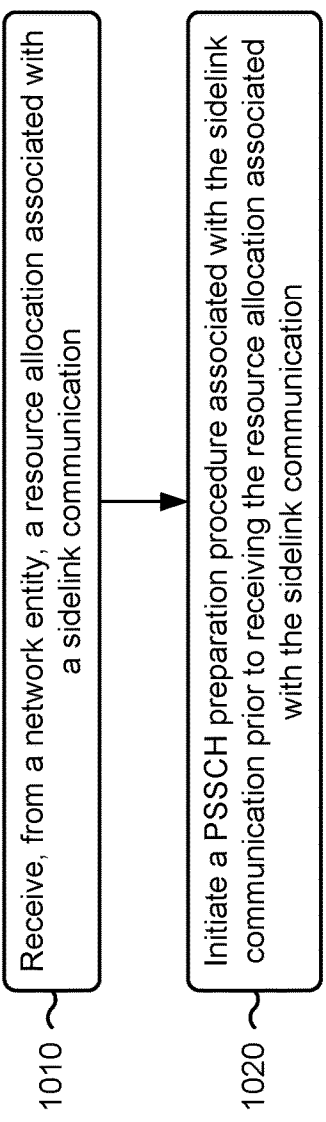
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with a sidelink preparation procedure time reduction.

As shown in FIG. 10, in some aspects, process 1000 may include receiving, from a network entity (e.g., network entity 110), a resource allocation associated with a sidelink communication (block 1010). For example, the UE (e.g., using communication manager 1208 and/or reception component 1202, depicted in FIG. 12) may receive, from a network entity, a resource allocation associated with a sidelink communication, as described above.

As further shown in FIG. 10, in some aspects, process 1000 may include initiating a PSSCH preparation procedure associated with the sidelink communication prior to receiving the resource allocation associated with the sidelink communication (block 1020). For example, the UE (e.g., using communication manager 1208 and/or sidelink component 1210, depicted in FIG. 12) may initiate a PSSCH preparation procedure associated with the sidelink communication prior to receiving the resource allocation associated with the sidelink communication, as described above.

Process 1000 may include additional aspects, such as any single aspect or any combination of aspects described below and/or in connection with one or more other processes described elsewhere herein.

In a first aspect, the sidelink communication is permitted to be transmitted after a time gap following reception of the resource allocation associated with the sidelink communication, and the time gap is less than $N_2+1$ symbols, with $N_2$ being equal to one of 10, 12, 23, or 36, corresponding to subcarrier spacings of 15 kHz, 30 kHz, 60 kHz, and 120 kHz, respectively.

In a second aspect, alone or in combination with the first aspect, initiating the PSSCH preparation procedure associated with the sidelink communication prior to receiving the resource allocation associated with the sidelink communication includes at least one of attaching a CRC to a transport block, selecting a low density parity check base graph, performing CB segmentation, attaching a CRC to one or more CBs, or performing channel encoding.

In a third aspect, alone or in combination with one or more of the first and second aspects, process 1000 includes transmitting, to the network entity, a BSR associated with a sidelink communication, wherein the BSR indicates a TBS associated with the sidelink communication, and wherein the resource allocation associated with the sidelink communication is based at least in part on the TBS.

In a fourth aspect, alone or in combination with one or more of the first through third aspects, process 1000 includes initiating the PSSCH preparation procedure associated with the sidelink communication prior to transmitting the BSR associated with the sidelink communication.

In a fifth aspect, alone or in combination with one or more of the first through fourth aspects, the BSR further indicates a selected base graph for low density parity check encoding.

In a sixth aspect, alone or in combination with one or more of the first through fifth aspects, the TBS associated with the sidelink communication is based at least in part on a selected modulation and coding scheme associated with the sidelink communication.

In a seventh aspect, alone or in combination with one or more of the first through sixth aspects, the resource allocation is based at least in part on a determined number of resource elements associated with a quadrature phase shift keying modulation.

In an eighth aspect, alone or in combination with one or more of the first through seventh aspects, the sidelink communication is associated with a selected modulation different than quadrature phase shift keying modulation, and the BSR further indicates a transport block scaling factor associated with the selected modulation.

In a ninth aspect, alone or in combination with one or more of the first through eighth aspects, the BSR further indicates at least one of an MCS associated with the sidelink communication, or a CQI associated with the sidelink communication.

In a tenth aspect, alone or in combination with one or more of the first through ninth aspects, the resource allocation is based at least in part on the at least one of the MCS associated with the sidelink communication, or the CQI associated with the sidelink communication.

In an eleventh aspect, alone or in combination with one or more of the first through tenth aspects, the BSR further indicates multiple candidate modulation and coding schemes associated with the sidelink communication.

In a twelfth aspect, alone or in combination with one or more of the first through eleventh aspects, the BSR indicates the TBS associated with the sidelink communication based at least in part on the sidelink communication being associated with a priority value that exceeds a threshold priority value.

In a thirteenth aspect, alone or in combination with one or more of the first through twelfth aspects, the BSR indicates the TBS associated with the sidelink communication based at least in part on a size of the TBS associated with the sidelink communication.

In a fourteenth aspect, alone or in combination with one or more of the first through thirteenth aspects, the BSR further indicates whether the TBS is associated with a modulation and coding scheme.

In a fifteenth aspect, alone or in combination with one or more of the first through fourteenth aspects, the BSR further indicates whether the TBS is a fixed size.

In a sixteenth aspect, alone or in combination with one or more of the first through fifteenth aspects, the resource allocation associated with the sidelink communication includes a number of resource elements, and the number of resource elements is smaller than a resource element threshold.

In a seventeenth aspect, alone or in combination with one or more of the first through sixteenth aspects, the resource allocation is not used for the sidelink communication based at least in part the number of resource elements being smaller than the resource element threshold.

In an eighteenth aspect, alone or in combination with one or more of the first through seventeenth aspects, process 1000 includes transmitting, to another UE, another sidelink communication using the resource allocation for the sidelink communication.

In a nineteenth aspect, alone or in combination with one or more of the first through eighteenth aspects, process 1000 includes transmitting, to the network entity, an indication that the resource allocation is not being used for the sidelink communication based at least in part on the number of resource elements being smaller than the resource element threshold.

In a twentieth aspect, alone or in combination with one or more of the first through nineteenth aspects, process 1000 includes transmitting, to another UE, an indication that only a portion of the sidelink communication will be transmitted using the resource allocation for the sidelink communication based at least in part on the number of resource elements being smaller than the resource element threshold.

In a twenty-first aspect, alone or in combination with one or more of the first through twentieth aspects, process 1000 includes transmitting, to the other UE, a first portion of the sidelink communication using the resource allocation for the sidelink communication, and a second portion of the sidelink communication using a resource allocation associated with a retransmission communication.

In a twenty-second aspect, alone or in combination with one or more of the first through twenty-first aspects, process 1000 includes transmitting, to the network entity, a buffer status report associated with another portion of the sidelink communication based at least in part on the number of resource elements being smaller than the resource element threshold.

In a twenty-third aspect, alone or in combination with one or more of the first through twenty-second aspects, the resource allocation associated with the sidelink communication includes a number of resource elements, and the number of resource elements is larger than a resource element threshold.

In a twenty-fourth aspect, alone or in combination with one or more of the first through twenty-third aspects, process 1000 includes appending at least one of padding bits, a sidelink channel state information reference signal, or a demodulation reference signal to the sidelink communication based at least in part on the number of resource elements being larger than the resource element threshold.

In a twenty-fifth aspect, alone or in combination with one or more of the first through twenty-fourth aspects, process 1000 includes repeating bits in a circular buffer associated with the sidelink communication based at least in part on the number of resource elements being larger than the resource element threshold.

In a twenty-sixth aspect, alone or in combination with one or more of the first through twenty-fifth aspects, process 1000 includes selecting a modulation order associated with the sidelink communication based at least in part on the number of resource elements being larger than the resource element threshold.

In a twenty-seventh aspect, alone or in combination with one or more of the first through twenty-sixth aspects, process 1000 includes transmitting, to another UE, the sidelink communication using a portion of the resource allocation associated with the sidelink communication based at least in part on the number of resource elements being larger than the resource element threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
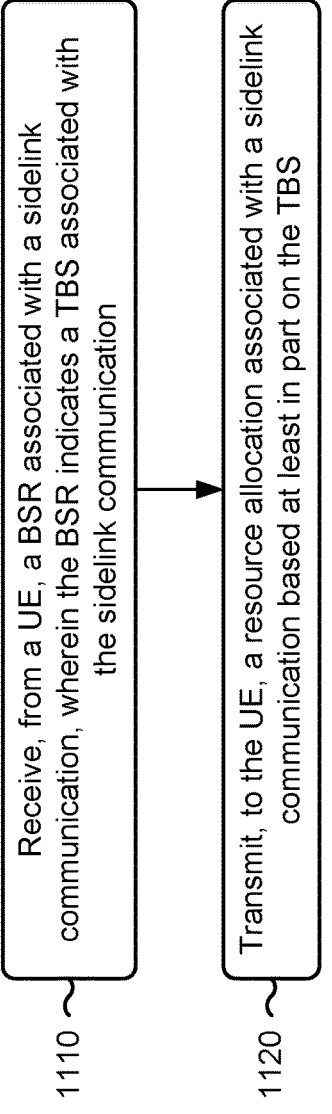
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., network entity 110) performs operations associated with a sidelink preparation procedure time reduction.

As shown in FIG. 11, in some aspects, process 1100 may include receiving, from a UE (e.g., UE 120), a BSR associated with a sidelink communication, wherein the BSR indicates a TBS associated with the sidelink communication (block 1110). For example, the network entity (e.g., using communication manager 1308 and/or reception component 1302, depicted in FIG. 13) may receive, from a UE, a BSR associated with a sidelink communication, wherein the BSR indicates a TBS associated with the sidelink communication, as described above.

As further shown in FIG. 11, in some aspects, process 1100 may include transmitting, to the UE, a resource allocation associated with a sidelink communication based at least in part on the TBS (block 1120). For example, the network entity (e.g., using communication manager 1308 and/or transmission component 1304, depicted in FIG. 13) may transmit, to the UE, a resource allocation associated with a sidelink communication based at least in part on the TBS, as described above.

Process 1100 may include additional aspects, such as any single aspect or any combination of aspects described below and/or in connection with one or more other processes described elsewhere herein.

In a first aspect, the sidelink communication is permitted to be transmitted after a time gap following reception of the resource allocation associated with the sidelink communication, and the time gap is less than $N_2+1$ symbols, with $N_2$ being equal to one of 10, 12, 23, or 36 corresponding to subcarrier spacings of 15 kHz, 30 kHz, 60 kHz, and 120 kHz, respectively.

In a second aspect, alone or in combination with the first aspect, the BSR further indicates a selected base graph for low density parity check encoding.

In a third aspect, alone or in combination with one or more of the first and second aspects, the TBS associated with the sidelink communication is based at least in part on a selected modulation and coding scheme associated with the sidelink communication.

In a fourth aspect, alone or in combination with one or more of the first through third aspects, the resource allocation is based at least in part on a determined number of resource elements associated with a quadrature phase shift keying modulation.

In a fifth aspect, alone or in combination with one or more of the first through fourth aspects, the sidelink communication is associated with a selected modulation different than quadrature phase shift keying modulation, and the BSR further indicates a transport block scaling factor associated with the selected modulation.

In a sixth aspect, alone or in combination with one or more of the first through fifth aspects, the BSR further indicates at least one of an MCS associated with the sidelink communication, or a CQI associated with the sidelink communication.

In a seventh aspect, alone or in combination with one or more of the first through sixth aspects, the resource allocation is based at least in part on the at least one of the MCS associated with the sidelink communication, or the CQI associated with the sidelink communication.

In an eighth aspect, alone or in combination with one or more of the first through seventh aspects, the BSR further indicates multiple candidate modulation and coding schemes associated with the sidelink communication.

In a ninth aspect, alone or in combination with one or more of the first through eighth aspects, the BSR indicates the TBS associated with the sidelink communication based at least in part on the sidelink communication being associated with a priority value that exceeds a threshold priority value.

In a tenth aspect, alone or in combination with one or more of the first through ninth aspects, the BSR indicates the TBS associated with the sidelink communication based at least in part on a size of the TBS associated with the sidelink communication.

In an eleventh aspect, alone or in combination with one or more of the first through tenth aspects, the BSR further indicates whether the TBS is associated with a modulation and coding scheme.

In a twelfth aspect, alone or in combination with one or more of the first through eleventh aspects, the BSR further indicates whether the TBS is a fixed size.

In a thirteenth aspect, alone or in combination with one or more of the first through twelfth aspects, the resource allocation associated with the sidelink communication includes a number of resource elements, and the number of resource elements is smaller than a resource element threshold.

In a fourteenth aspect, alone or in combination with one or more of the first through thirteenth aspects, the resource allocation is not used for the sidelink communication based at least in part the number of resource elements being smaller than the resource element threshold.

In a fifteenth aspect, alone or in combination with one or more of the first through fourteenth aspects, process 1100 includes receiving, from the UE, an indication that the resource allocation is not being used for the sidelink communication based at least in part on the number of resource elements being smaller than the resource element threshold.

In a sixteenth aspect, alone or in combination with one or more of the first through fifteenth aspects, process 1100 includes receiving, from the UE, another BSR associated with a portion of the sidelink communication based at least in part on the number of resource elements being smaller than the resource element threshold.

In a seventeenth aspect, alone or in combination with one or more of the first through sixteenth aspects, the resource allocation associated with the sidelink communication includes a number of resource elements, and the number of resource elements is larger than a resource element threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
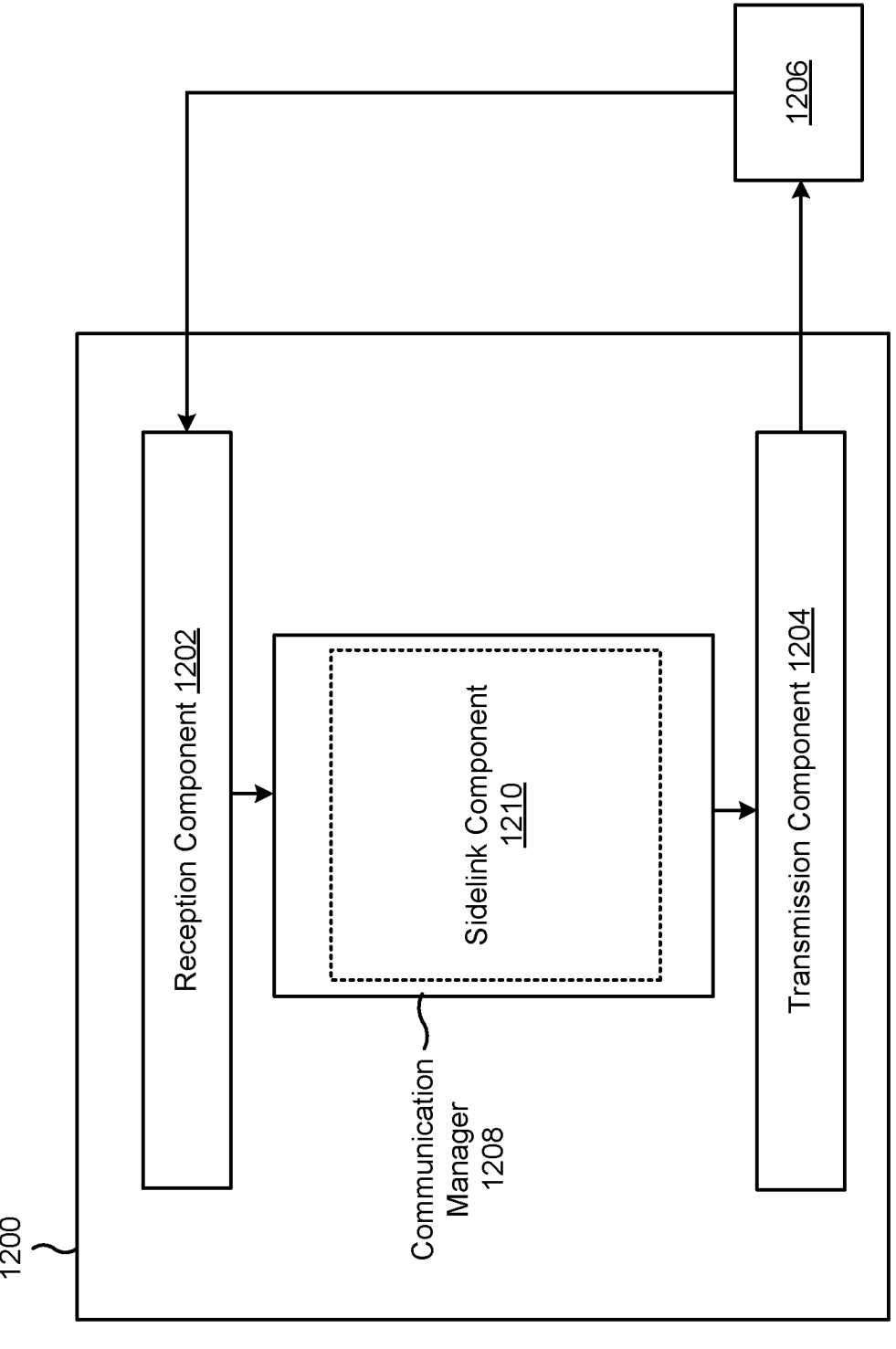
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE (e.g., UE 120), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208 (e.g., communication manager 140). The communication manager 1208 may include a sidelink component 1210, among other examples.

In some aspects, the apparatus 1200 may be configured to perform one or more operations described herein in connection with FIGS. 8-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE 120 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE 120 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE 120 described in connection with FIG. 2. In some aspects, the transmission component 1204 may be co-located with the reception component 1202 in a transceiver.

The reception component 1202 may receive, from a network entity, a resource allocation associated with a sidelink communication. The sidelink component 1210 may initiate a PSSCH preparation procedure associated with the sidelink communication prior to receiving the resource allocation associated with the sidelink communication.

The transmission component 1204 may transmit, to the network entity, a BSR associated with a sidelink communication, wherein the BSR indicates a TBS associated with the sidelink communication, and wherein the resource allocation associated with the sidelink communication is based at least in part on the TBS.

The sidelink component 1210 may initiate the PSSCH preparation procedure associated with the sidelink communication prior to transmitting the BSR associated with the sidelink communication.

The transmission component 1204 and/or the sidelink component 1210 may transmit, to another UE, another sidelink communication using the resource allocation for the sidelink communication.

The transmission component 1204 may transmit, to the network entity, an indication that the resource allocation is not being used for the sidelink communication based at least in part on the number of resource elements being smaller than the resource element threshold.

The transmission component 1204 and/or the sidelink component 1210 may transmit, to another UE, an indication that only a portion of the sidelink communication will be transmitted using the resource allocation for the sidelink communication based at least in part on the number of resource elements being smaller than the resource element threshold.

The transmission component 1204 and/or the sidelink component 1210 may transmit, to the other UE, a first portion of the sidelink communication using the resource allocation for the sidelink communication, and a second portion of the sidelink communication using a resource allocation associated with a retransmission communication.

The transmission component 1204 may transmit, to the network entity, a buffer status report associated with another portion of the sidelink communication based at least in part on the number of resource elements being smaller than the resource element threshold.

The sidelink component 1210 may append at least one of padding bits, a sidelink channel state information reference signal, or a demodulation reference signal to the sidelink communication based at least in part on the number of resource elements being larger than the resource element threshold.

The sidelink component 1210 may repeat bits in a circular buffer associated with the sidelink communication based at least in part on the number of resource elements being larger than the resource element threshold.

The sidelink component 1210 may select a modulation order associated with the sidelink communication based at least in part on the number of resource elements being larger than the resource element threshold.

The transmission component 1204 and/or the sidelink component 1210 may transmit, to another UE, the sidelink communication using a portion of the resource allocation associated with the sidelink communication based at least in part on the number of resource elements being larger than the resource element threshold.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
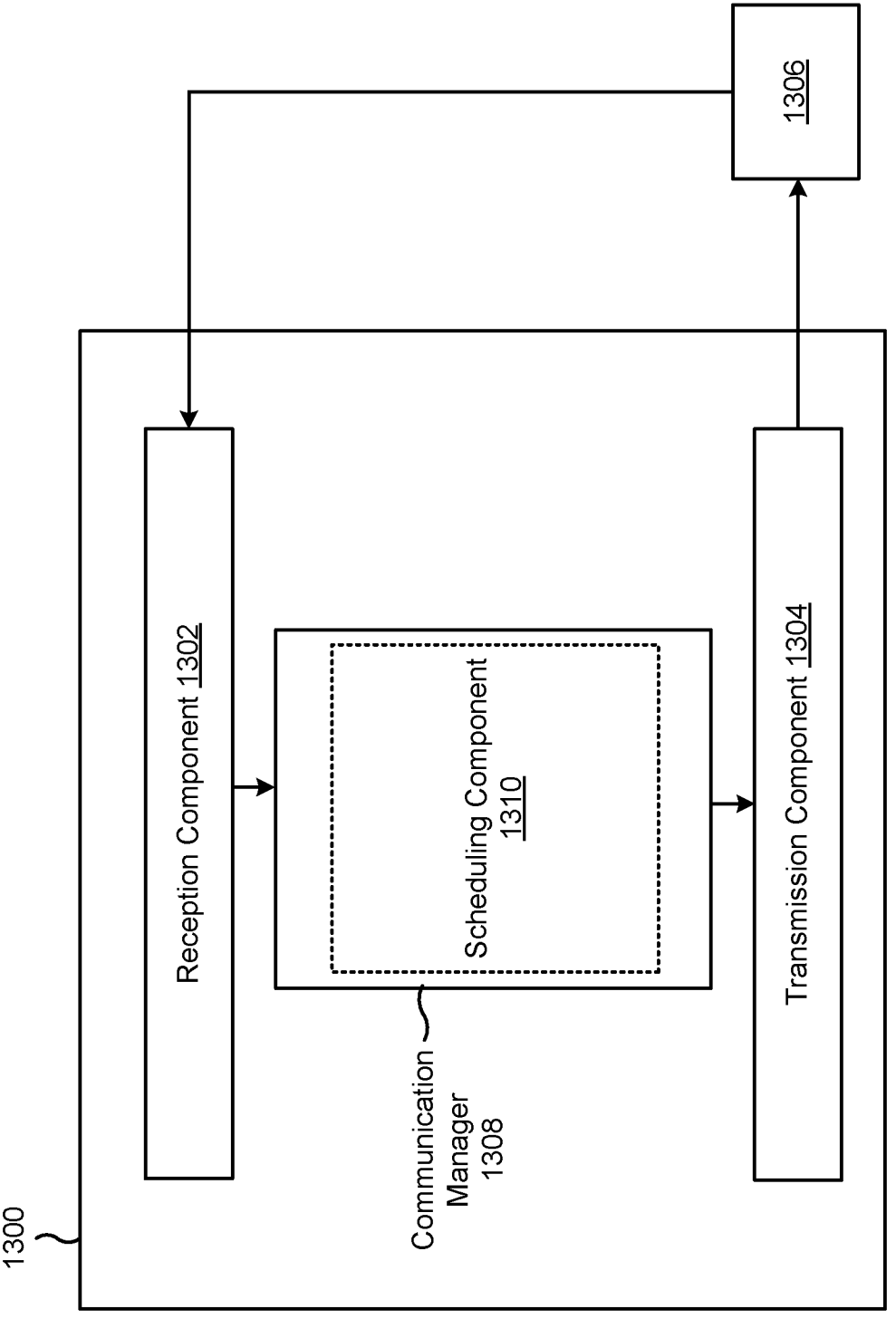
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network entity (e.g., network entity 110), or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308 (e.g., communication manager 150). The communication manager 1308 may include a scheduling component 1310, among other examples.

In some aspects, the apparatus 1300 may be configured to perform one or more operations described herein in connection with FIGS. 8-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network entity 110 described in connection with FIG. 2. Additionally, or alternatively, one or more components shown in FIG. 13 may be implemented within one or more components described in connection with FIG.

2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity 110 described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity 110 described in connection with FIG. 2. In some aspects, the transmission component 1304 may be co-located with the reception component 1302 in a transceiver.

The reception component 1302 may receive, from a UE (e.g., UE 120), a BSR associated with a sidelink communication, wherein the BSR indicates a TBS associated with the sidelink communication. The transmission component 1304 and/or the scheduling component 1310 may transmit, to the UE, a resource allocation associated with a sidelink communication based at least in part on the TBS.

The reception component 1302 may receive, from the UE, an indication that the resource allocation is not being used for the sidelink communication based at least in part on the number of resource elements being smaller than the resource element threshold.

The reception component 1302 may receive, from the UE, another BSR associated with a portion of the sidelink communication based at least in part on the number of resource elements being smaller than the resource element threshold.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving, from a network entity, a resource allocation associated with a sidelink communication; and initiating a PS SCH preparation procedure associated with the sidelink communication prior to receiving the resource allocation associated with the sidelink communication.

Aspect 2: The method of Aspect 1, wherein the sidelink communication is permitted to be transmitted after a time gap following reception of the resource allocation associated with the sidelink communication, and wherein the time gap is less than $N_2+1$ symbols, with $N_2$ being equal to one of 10, 12, 23, or 36, corresponding to subcarrier spacings of 15 kHz, 30 kHz, 60 kHz, and 120 kHz, respectively.

Aspect 3: The method of any of Aspects 1-2, wherein initiating the PSSCH preparation procedure associated with the sidelink communication prior to receiving the resource allocation associated with the sidelink communication includes at least one of: attaching a CRC to a transport block, selecting a low density parity check base graph, performing CB segmentation, attaching a CRC to one or more CBs, or performing channel encoding.

Aspect 4: The method of any of Aspects 1-3, further comprising transmitting, to the network entity, a BSR associated with a sidelink communication, wherein the BSR indicates a TBS associated with the sidelink communication, and wherein the resource allocation associated with the sidelink communication is based at least in part on the TBS.

Aspect 5: The method of Aspect 4, further comprising initiating the PS SCH preparation procedure associated with the sidelink communication prior to transmitting the BSR associated with the sidelink communication.

Aspect 6: The method of any of Aspects 4-5, wherein the BSR further indicates a selected base graph for low density parity check encoding.

Aspect 7: The method of any of Aspects 4-6, wherein the TBS associated with the sidelink communication is based at least in part on a selected modulation and coding scheme associated with the sidelink communication.

Aspect 8: The method of any of Aspects 4-7, wherein the resource allocation is based at least in part on a determined number of resource elements associated with a quadrature phase shift keying modulation.

Aspect 9: The method of any of Aspects 4-8, wherein the sidelink communication is associated with a selected modulation different than quadrature phase shift keying modulation, and wherein the BSR further indicates a transport block scaling factor associated with the selected modulation.

Aspect 10: The method of any of Aspects 4-9, wherein the BSR further indicates at least one of an MCS associated with the sidelink communication, or a CQI associated with the sidelink communication.

Aspect 11: The method of Aspect 10, wherein the resource allocation is based at least in part on the at least one of the MCS associated with the sidelink communication, or the CQI associated with the sidelink communication.

Aspect 12: The method of any of Aspects 4-11, wherein the BSR further indicates multiple candidate modulation and coding schemes associated with the sidelink communication.

Aspect 13: The method of any of Aspects 4-12, wherein the BSR indicates the TBS associated with the sidelink communication based at least in part on the sidelink communication being associated with a priority value that exceeds a threshold priority value.

Aspect 14: The method of any of Aspects 4-13, wherein the BSR indicates the TBS associated with the sidelink communication based at least in part on a size of the TBS associated with the sidelink communication.

Aspect 15: The method of any of Aspects 4-14, wherein the BSR further indicates whether the TBS is associated with a modulation and coding scheme.

Aspect 16: The method of any of Aspects 4-15, wherein the BSR further indicates whether the TBS is a fixed size.

Aspect 17: The method of any of Aspects 1-16, wherein the resource allocation associated with the sidelink communication includes a number of resource elements, and wherein the number of resource elements is smaller than a resource element threshold.

Aspect 18: The method of Aspect 17, wherein the resource allocation is not used for the sidelink communication based at least in part the number of resource elements being smaller than the resource element threshold.

Aspect 19: The method of Aspect 18, further comprising transmitting, to another UE, another sidelink communication using the resource allocation for the sidelink communication.

Aspect 20: The method of any of Aspects 18-19, further comprising transmitting, to the network entity, an indication that the resource allocation is not being used for the sidelink communication based at least in part on the number of resource elements being smaller than the resource element threshold.

Aspect 21: The method of Aspect 17, further comprising transmitting, to another UE, an indication that only a portion of the sidelink communication will be transmitted using the resource allocation for the sidelink communication based at least in part on the number of resource elements being smaller than the resource element threshold.

Aspect 22: The method of Aspect 21, further comprising transmitting, to the other UE, a first portion of the sidelink communication using the resource allocation for the sidelink communication, and a second portion of the sidelink communication using a resource allocation associated with a retransmission communication.

Aspect 23: The method of any of Aspects 21-22, further comprising transmitting, to the network entity, a buffer status report associated with another portion of the sidelink communication based at least in part on the number of resource elements being smaller than the resource element threshold.

Aspect 24: The method of any of Aspects 1-16, wherein the resource allocation associated with the sidelink communication includes a number of resource elements, and wherein the number of resource elements is larger than a resource element threshold.

Aspect 25: The method of Aspect 24, further comprising appending at least one of padding bits, a sidelink channel state information reference signal, or a demodulation reference signal to the sidelink communication based at least in part on the number of resource elements being larger than the resource element threshold.

Aspect 26: The method of any of Aspects 24-25, further comprising repeating bits in a circular buffer associated with the sidelink communication based at least in part on the number of resource elements being larger than the resource element threshold.

Aspect 27: The method of any of Aspects 24-26, further comprising selecting a modulation order associated with the sidelink communication based at least in part on the number of resource elements being larger than the resource element threshold.

Aspect 28: The method of any of Aspects 24-27, further comprising transmitting, to another UE, the sidelink communication using a portion of the resource allocation associated with the sidelink communication based at least in part on the number of resource elements being larger than the resource element threshold.

Aspect 29: A method of wireless communication performed by a network entity, comprising: receiving, from a UE, a BSR associated with a sidelink communication, wherein the BSR indicates TBS associated with the sidelink communication; and transmitting, to the UE, a resource allocation associated with a sidelink communication based at least in part on the TBS.

Aspect 30: The method of Aspect 29, wherein the sidelink communication is permitted to be transmitted after a time gap following reception of the resource allocation associated with the sidelink communication, and wherein the time gap is less than $N_2+1$ symbols, with $N_2$ being equal to one of 10, 12, 23, or 36 corresponding to subcarrier spacings of 15 kHz, 30 kHz, 60 kHz, and 120 kHz, respectively.

Aspect 31: The method of any of Aspects 29-30, wherein the BSR further indicates a selected base graph for low density parity check encoding.

Aspect 32: The method of any of Aspects 29-31, wherein the TBS associated with the sidelink communication is based at least in part on a selected modulation and coding scheme associated with the sidelink communication.

Aspect 33: The method of any of Aspects 29-32, wherein the resource allocation is based at least in part on a determined number of resource elements associated with a quadrature phase shift keying modulation.

Aspect 34: The method of any of Aspects 29-33, wherein the sidelink communication is associated with a selected modulation different than quadrature phase shift keying modulation, and wherein the BSR further indicates a transport block scaling factor associated with the selected modulation.

Aspect 35: The method of any of Aspects 29-34, wherein the BSR further indicates at least one of a MCS associated with the sidelink communication, or a CQI associated with the sidelink communication.

Aspect 36: The method of Aspect 35, wherein the resource allocation is based at least in part on the at least one of the MCS associated with the sidelink communication, or the CQI associated with the sidelink communication.

Aspect 37: The method of any of Aspects 29-36, wherein the BSR further indicates multiple candidate modulation and coding schemes associated with the sidelink communication.

Aspect 38: The method of any of Aspects 29-37, wherein the BSR indicates the TBS associated with the sidelink communication based at least in part on the sidelink communication being associated with a priority value that exceeds a threshold priority value.

Aspect 39: The method of any of Aspects 29-38, wherein the BSR indicates the TBS associated with the sidelink communication based at least in part on a size of the TBS associated with the sidelink communication.

Aspect 40: The method of any of Aspects 29-39, wherein the BSR further indicates whether the TBS is associated with a modulation and coding scheme.

Aspect 41: The method of any of Aspects 29-40, wherein the BSR further indicates whether the TBS is a fixed size.

Aspect 42: The method of any of Aspects 29-41, wherein the resource allocation associated with the sidelink communication includes a number of resource elements, and wherein the number of resource elements is smaller than a resource element threshold.

Aspect 43: The method of Aspect 42, wherein the resource allocation is not used for the sidelink communication based at least in part the number of resource elements being smaller than the resource element threshold.

Aspect 44: The method of Aspect 43, further comprising receiving, from the UE, an indication that the resource allocation is not being used for the sidelink communication based at least in part on the number of resource elements being smaller than the resource element threshold.

Aspect 45: The method of any of Aspects 43-44, further comprising receiving, from the UE, another BSR associated with a portion of the sidelink communication based at least in part on the number of resource elements being smaller than the resource element threshold.

Aspect 46: The method of any of Aspects 29-41, wherein the resource allocation associated with the sidelink communication includes a number of resource elements, and wherein the number of resource elements is larger than a resource element threshold.

Aspect 47: An apparatus for wireless communication at a device, comprising a processor; memory coupled with the processor; and instructions stored in the memory and executable by the processor to cause the apparatus to perform the method of one or more of Aspects 1-28.

Aspect 48: A device for wireless communication, comprising a memory and one or more processors coupled to the memory, the one or more processors configured to perform the method of one or more of Aspects 1-28.

Aspect 49: An apparatus for wireless communication, comprising at least one means for performing the method of one or more of Aspects 1-28.

Aspect 50: A non-transitory computer-readable medium storing code for wireless communication, the code comprising instructions executable by a processor to perform the method of one or more of Aspects 1-28.

Aspect 51: A non-transitory computer-readable medium storing a set of instructions for wireless communication, the set of instructions comprising one or more instructions that, when executed by one or more processors of a device, cause the device to perform the method of one or more of Aspects 1-28.

Aspect 52: An apparatus for wireless communication at a device, comprising a processor; memory coupled with the processor; and instructions stored in the memory and executable by the processor to cause the apparatus to perform the method of one or more of Aspects 29-46.

Aspect 53: A device for wireless communication, comprising a memory and one or more processors coupled to the memory, the one or more processors configured to perform the method of one or more of Aspects 29-46.

Aspect 54: An apparatus for wireless communication, comprising at least one means for performing the method of one or more of Aspects 29-46.

Aspect 55: A non-transitory computer-readable medium storing code for wireless communication, the code comprising instructions executable by a processor to perform the method of one or more of Aspects 29-46.

Aspect 56: A non-transitory computer-readable medium storing a set of instructions for wireless communication, the set of instructions comprising one or more instructions that, when executed by one or more processors of a device, cause the device to perform the method of one or more of Aspects 29-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      initiate a physical sidelink shared channel (PSSCH) preparation procedure associated with a sidelink communication;
      transmit, to a network entity after initiating the PSSCH, a buffer status report (BSR) indicating a transport block size (TBS) associated with the sidelink communication; and
      receive, from the network entity after the transmitting the BSR, a resource allocation associated with the sidelink communication, wherein the resource allocation is based at least in part on the TBS.

2. The apparatus of claim 1, wherein the sidelink communication is permitted to be transmitted after a time gap following reception of the resource allocation associated with the sidelink communication, and wherein the time gap is less than N2+1 symbols, with N2 being equal to one of 10, 12, 23, or 36, corresponding to subcarrier spacings of 15 kHz, 30 kHz, 60 kHz, and 120 kHz, respectively.

3. The apparatus of claim 1, wherein the one or more processors, to initiate the PSSCH preparation procedure associated with the sidelink communication prior to receiving the resource allocation associated with the sidelink communication, are configured to attach a cyclic redundancy check (CRC) to a transport block, select a low density parity check base graph, perform code block (CB) segmentation, attach a CRC to one or more CBs, or perform channel encoding.

4. The apparatus of claim 1, wherein the TBS associated with the sidelink communication is based at least in part on a selected modulation and coding scheme associated with the sidelink communication.

5. The apparatus of claim 1, wherein the resource allocation associated with the sidelink communication is based at least in part on a determined number of resource elements associated with a quadrature phase shift keying modulation.

6. The apparatus of claim 1, wherein the sidelink communication is associated with a selected modulation different than quadrature phase shift keying modulation, and
   wherein the BSR further indicates a transport block scaling factor associated with the selected modulation.

7. The apparatus of claim 1, wherein the BSR further indicates whether the TBS is associated with a modulation and coding scheme.

8. The apparatus of claim 1, wherein the BSR further indicates whether the TBS is a fixed size.

9. The apparatus of claim 1, wherein the resource allocation associated with the sidelink communication includes a number of resource elements, and wherein the number of resource elements is smaller than a resource element threshold.

10. The apparatus of claim 9, wherein the resource allocation associated with the sidelink communication is not used for the sidelink communication based at least in part the number of resource elements being smaller than the resource element threshold.

11. The apparatus of claim 10, wherein the one or more processors are further configured to transmit, to another UE, another sidelink communication using the resource allocation associated with the sidelink communication.

12. The apparatus of claim 9, wherein the one or more processors are further configured to transmit, to another UE, an indication that only a portion of the sidelink communication will be transmitted using the resource allocation associated with the sidelink communication based at least in part on the number of resource elements being smaller than the resource element threshold.

13. The apparatus of claim 12, wherein the one or more processors are further configured to transmit, to the other UE, a first portion of the sidelink communication using the resource allocation associated with the sidelink communication, and a second portion of the sidelink communication using a resource allocation associated with a retransmission communication.

14. The apparatus of claim 12, wherein the one or more processors are further configured to transmit, to the network entity, another buffer status report associated with another portion of the sidelink communication based at least in part on the number of resource elements being smaller than the resource element threshold.

15. The apparatus of claim 1, wherein the resource allocation associated with the sidelink communication includes a number of resource elements, and wherein the number of resource elements is larger than a resource element threshold.

16. The apparatus of claim 15, wherein the one or more processors are further configured to append at least one of padding bits, a sidelink channel state information reference signal, or a demodulation reference signal to the sidelink communication based at least in part on the number of resource elements being larger than the resource element threshold.

17. The apparatus of claim 15, wherein the one or more processors are further configured to repeat bits in a circular buffer associated with the sidelink communication based at least in part on the number of resource elements being larger than the resource element threshold.

18. The apparatus of claim 15, wherein the one or more processors are further configured to select a modulation order associated with the sidelink communication based at least in part on the number of resource elements being larger than the resource element threshold.

19. The apparatus of claim 15, wherein the one or more processors are further configured to transmit, to another UE, the sidelink communication using a portion of the resource allocation associated with the sidelink communication based at least in part on the number of resource elements being larger than the resource element threshold.

20. An apparatus for wireless communication at a network entity, comprising:
one or more memories; and
one or more processors, coupled to the one or more memories, configured to:
receive, from a user equipment (UE), a buffer status report (BSR) associated with a sidelink communication, wherein the BSR indicates a transport block size (TBS) associated with the sidelink communication; and
transmit, to the UE after receiving the BSR, a resource allocation associated with a sidelink communication, wherein the resource allocation is based at least in part on the TBS.

21. The apparatus of claim 20, wherein the sidelink communication is permitted to be transmitted after a time gap following reception of the resource allocation associated with the sidelink communication, and wherein the time gap is less than N2+1 symbols, with N2 being equal to one of 10, 12, 23, or 36 corresponding to subcarrier spacings of 15 kHz, 30 kHz, 60 kHz, and 120 kHz, respectively.

22. The apparatus of claim 20, wherein the TBS associated with the sidelink communication is based at least in part on a selected modulation and coding scheme associated with the sidelink communication.

23. The apparatus of claim 20, wherein the BSR further indicates whether the TBS is a fixed size.

24. A method of wireless communication performed by a user equipment (UE), comprising:
initiating a physical sidelink shared channel (PSSCH) preparation procedure associated with a sidelink communication prior;
transmitting, to a network entity after initiating the PSSCH, a buffer status report (BSR) indicating a transport block size (TBS) associated with the sidelink communication; and
receiving, from the network entity after the transmitting the BSR, a resource allocation associated with the sidelink communication, wherein the resource allocation is based at least in part on the TBS.

25. The method of claim 24, wherein the sidelink communication is permitted to be transmitted after a time gap following reception of the resource allocation associated with the sidelink communication, and wherein the time gap is less than N2+1 symbols, with N2 being equal to one of 10, 12, 23, or 36, corresponding to subcarrier spacings of 15 kHz, 30 kHz, 60 kHz, and 120 kHz, respectively.

26. A method of wireless communication performed by a network entity, comprising:
receiving, from a user equipment (UE), a buffer status report (BSR) associated with a sidelink communication, wherein the BSR indicates a transport block size (TBS) associated with the sidelink communication; and
transmitting, to the UE after receiving the BSR, a resource allocation associated with a sidelink communication, wherein the resource allocation is based at least in part on the TBS.

27. The method of claim 26, wherein the sidelink communication is permitted to be transmitted after a time gap following reception of the resource allocation associated with the sidelink communication, and wherein the time gap is less than N2+1 symbols, with N2 being equal to one of 10, 12, 23, or 36 corresponding to subcarrier spacings of 15 kHz, 30 kHz, 60 kHz, and 120 kHz, respectively.

28. The method of claim 24, wherein the TBS associated with the sidelink communication is based at least in part on a selected modulation and coding scheme associated with the sidelink communication.

29. The method of claim 24, wherein the resource allocation associated with the sidelink communication is based at least in part on a determined number of resource elements associated with a quadrature phase shift keying modulation.

30. The method of claim 24, wherein the sidelink communication is associated with a selected modulation different than quadrature phase shift keying modulation, and wherein the BSR further indicates a transport block scaling factor associated with the selected modulation.

\* \* \* \* \*